United States Patent
Kamon et al.

(10) Patent No.: US 9,294,740 B2
(45) Date of Patent: Mar. 22, 2016

(54) IMAGING DEVICE HAVING A COLOR IMAGE GENERATOR GENERATING A COLOR IMAGE USING EDGE DATA AND A FAKE COLOR SUPPRESSING COEFFICIENT

(75) Inventors: Koichi Kamon, Otokuni-gun (JP); Tetsuya Katagiri, Kyoto-shi (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 529 days.

(21) Appl. No.: 13/702,946

(22) PCT Filed: May 23, 2011

(86) PCT No.: PCT/JP2011/002844
§ 371 (c)(1),
(2), (4) Date: Jan. 10, 2013

(87) PCT Pub. No.: WO2011/155136
PCT Pub. Date: Dec. 15, 2011

(65) Prior Publication Data
US 2013/0208117 A1    Aug. 15, 2013

(30) Foreign Application Priority Data
Jun. 7, 2010    (JP) .................... 2010-129729

(51) Int. Cl.
*H04N 9/04*    (2006.01)
*H04N 5/33*    (2006.01)
*H04N 5/355*    (2011.01)

(52) U.S. Cl.
CPC .............. *H04N 9/04* (2013.01); *H04N 5/332* (2013.01); *H04N 5/35518* (2013.01); *H04N 9/045* (2013.01)

(58) Field of Classification Search
None
See application file for complete search history.

(56) References Cited

U.S. PATENT DOCUMENTS

| 5,455,621 A | 10/1995 | Morimura | |
| 6,011,251 A * | 1/2000 | Dierickx et al. | 250/208.1 |
| 6,278,751 B1 * | 8/2001 | Uramoto | 375/345 |

(Continued)

FOREIGN PATENT DOCUMENTS

| EP | 2 343 904 | 7/2011 |
| JP | 06-141229 | 5/1994 |

(Continued)

OTHER PUBLICATIONS

Toyota Motor Corporation Technology, ITS, Approach by ITS, wvvw.toyota.co.jp/jpn/tech/safety/technology/technology_file/active/night_view.html.

*Primary Examiner* — William C Vaughn, Jr.
*Assistant Examiner* — Michael J Hess
(74) *Attorney, Agent, or Firm* — Cozen O'Connor

(57) ABSTRACT

An imaging device is provided with an imaging element. The imaging element has a sensitive wavelength region including an infrared wavelength region, and selectively including a visible wavelength region, and is composed of at least three types of pixels having spectral sensitivities different from each other. The imaging device generates a color image, based on a luminance signal including an infrared wavelength component, and based on a color-difference signal that has been generated based on a visible wavelength component in original image data. The luminance signal including an infrared wavelength component is generated, based on a signal obtained by compressing the dynamic range of original image data including at least three types of original image components acquired by an imaging operation of the imaging element.

9 Claims, 17 Drawing Sheets

(56) References Cited

U.S. PATENT DOCUMENTS

| | | |
|---|---|---|
| 6,927,884 B2 | 8/2005 | Takada et al. |
| 2002/0047911 A1* | 4/2002 | Tsuchiya et al. ............. 348/252 |
| 2002/0054389 A1 | 5/2002 | Takada et al. |
| 2006/0044436 A1* | 3/2006 | Watanabe ..................... 348/308 |
| 2006/0054782 A1* | 3/2006 | Olsen et al. ................. 250/208.1 |
| 2006/0177129 A1* | 8/2006 | Matsuyama ................... 382/167 |
| 2007/0057954 A1* | 3/2007 | Imamura et al. ............. 345/532 |
| 2007/0153099 A1* | 7/2007 | Ohki et al. .................... 348/234 |
| 2007/0183657 A1 | 8/2007 | Kidono et al. |
| 2007/0187794 A1* | 8/2007 | Fukuyoshi et al. ........... 257/440 |
| 2007/0216957 A1 | 9/2007 | Kamon et al. |
| 2010/0283866 A1* | 11/2010 | Numata .................... 348/223.1 |
| 2011/0243430 A1 | 10/2011 | Hung et al. |

FOREIGN PATENT DOCUMENTS

| | | |
|---|---|---|
| JP | 2002-77733 | 3/2002 |
| JP | 2007-174277 | 7/2007 |
| JP | 2007/184805 | 7/2007 |
| JP | 2007-251898 | 9/2007 |
| JP | 2009-081526 | 4/2009 |
| WO | WO 2010/053029 | 5/2010 |

\* cited by examiner

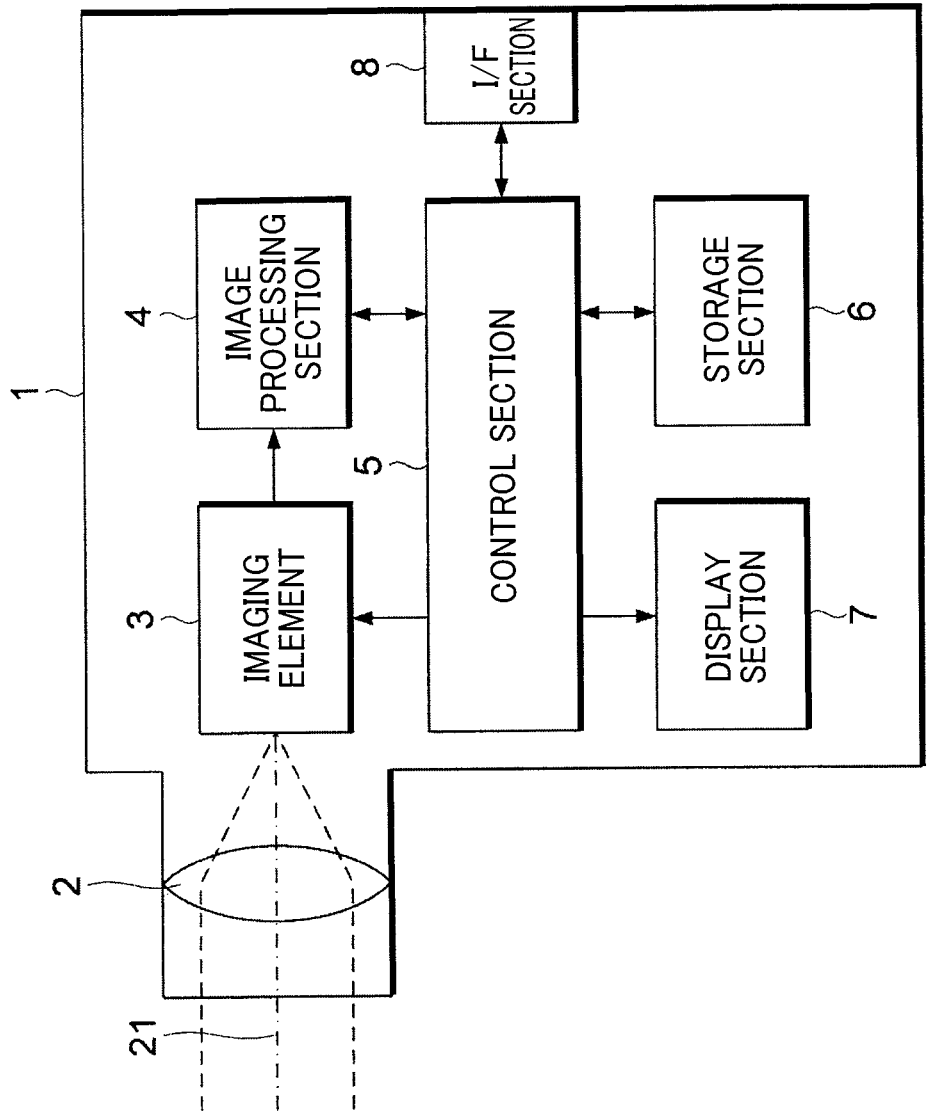

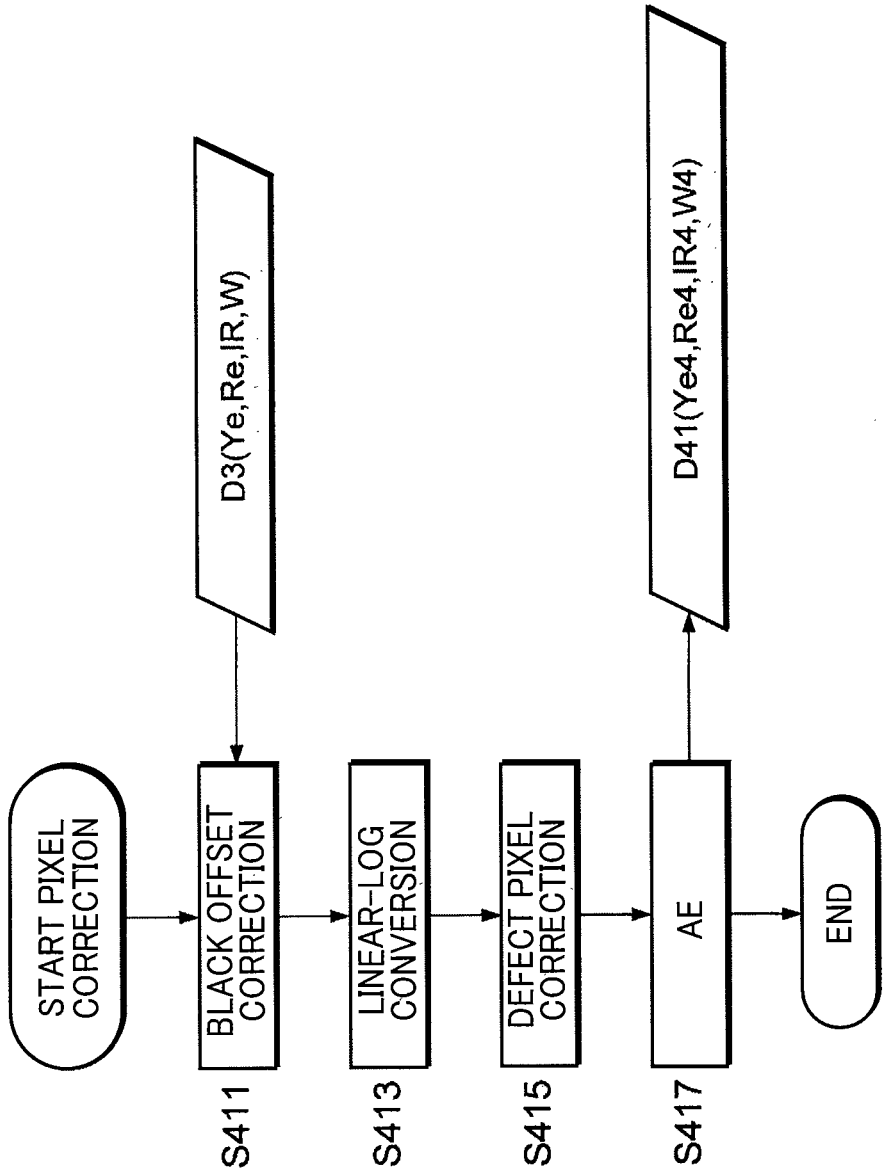

FIG.8A
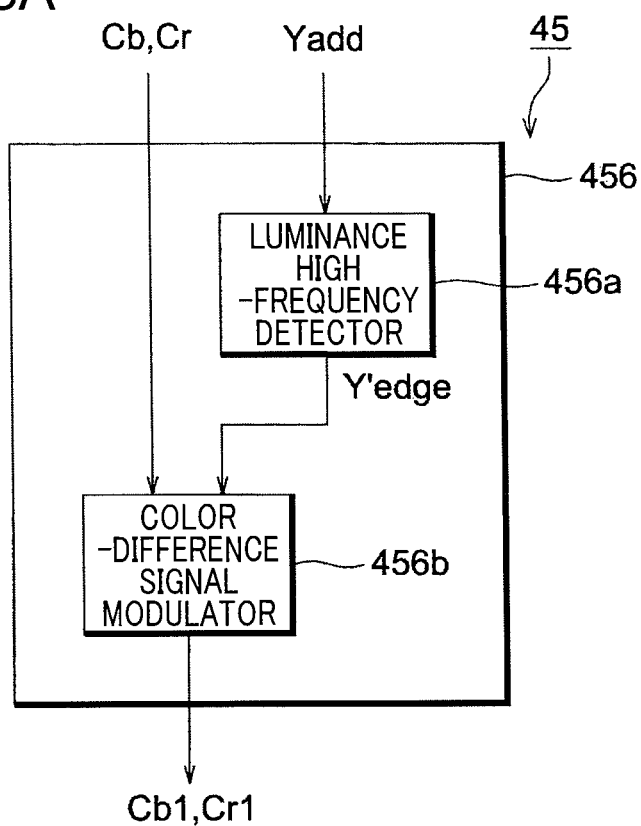
FIG.8B
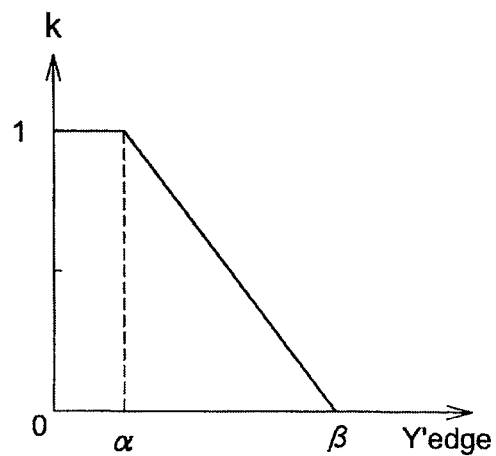
FIG.8C

IMAGING DEVICE HAVING A COLOR IMAGE GENERATOR GENERATING A COLOR IMAGE USING EDGE DATA AND A FAKE COLOR SUPPRESSING COEFFICIENT

RELATED APPLICATIONS

This is a U.S. National Phase Application under 35 USC 371 of International Application PCT/JP2011/002844 filed on May 23, 2011.

This application claims the priority of Japanese application no. 2010-129729 filed Jun. 7, 2010, the entire content of which is hereby incorporated by reference.

TECHNICAL FIELD

The present invention relates to an imaging device, and more particularly to an imaging device for generating a color image by performing an image processing to original image data having a wide dynamic range.

BACKGROUND ART

An imaging element having a general linear photoelectric conversion characteristic cannot accurately acquire a luminance distribution on a dark portion or a bright portion even with respect to an ordinary subject due to the narrow dynamic range thereof. Further, although an imaging element with a logarithmic conversion type photoelectric conversion characteristic has a sufficiently wide dynamic range with respect to an ordinary subject, the imaging element may have a poor sensitivity on the low luminance side.

In view of the above, for instance, as disclosed in patent literature 1, there has been known a linear-logarithmic conversion type imaging element (hereinafter, called as a "linear-log sensor") having two photoelectric conversion characteristics (hereinafter, called as "a linear-log characteristic") i.e. a linear characteristic and a logarithmic characteristic in accordance with an incident light amount. Such a linear-log sensor is capable of satisfying both of the requirements on sensitivity and wide dynamic range by performing an imaging operation with a linear characteristic having a high sensitivity on the low luminance side, and by performing an imaging operation with a logarithmic characteristic having a wide dynamic range on the high luminance side.

Further, for instance, as disclosed in patent literature 2, there has been known a method for acquiring an image having a wide dynamic range by combining images obtained by performing imaging operations while changing an exposure time, with use of an imaging element having a linear photoelectric conversion characteristic. In addition to the above, there has been proposed a sensor having a so-called knee characteristic i.e. a linear photoelectric conversion characteristic having gradients different from each other in accordance with an incident light amount.

On the other hand, for instance, as disclosed in non-patent literature 1, there has been developed a so-called night view function. To perform the night view function, a near infrared camera is loaded in an automobile to display images of pedestrians and/or vehicles in a front direction at nighttime on a monitor. However, an image obtained by the near infrared camera is monochromatic and is different from an image directly viewed by human eyes. This may provide the viewers incongruity.

Further, there has also been known an imaging apparatus for imaging a night scene in colors. For instance, patent literature 3 discloses an imaging apparatus for generating a pseudo color image by extracting visible image data composed of R, G, and B color components, and infrared image data, with use of image data obtained by an imaging element provided with R, G, and B color filters, and an Ir filter for transmitting infrared light; and by generating luminance information by applying a weight to luminance information obtained from the visible image data and luminance information obtained from the infrared image data.

However, since the quantity of photon is small at nighttime, the S/N ratio of an image obtained at nighttime may be small. Patent literature 3, however, does not consider such a drawback.

Further, non-patent literature 1 involves a drawback that an image may be less visible, because the viewer may be blinded by strong light such as headlight from an opposing automobile.

CITATION LIST

Patent Literature

Patent literature 1: JP 2002-77733A
Patent literature 2: JP Hei 6-141229A
Patent literature 3: JP 2007-184805A

Non-Patent Literature

Non-patent literature 1:
Toyota Motor Corporation→Technology→ITS→Approach by ITS (for details, see here)→Safety Measures→Preventive Safety Measures (for details, see here)→View Support→Night View (http://www.toyota.co.jp/jpn/tech/safety/technology/technology_file/active/night_view.html) retrieved on May 6, 2011

SUMMARY OF INVENTION

Technical Problem

In view of the above, an object of the invention is to provide an imaging device that enables to acquire a clear color image having an enhanced S/N ratio at nighttime and a wide dynamic range.

Solution to Problem

To solve the above problem, an imaging device according to one aspect of the invention includes an imaging optical system which forms a subject image; an imaging element which has a sensitive wavelength region including an infrared wavelength region, and selectively including a visible wavelength region, the imaging element being composed of at least three types of pixels having spectral sensitivities different from each other, and configured to generate original image data including at least three types of original image components to be outputted from each of the pixels by imaging the subject image; and an image processing section. The image processing section includes a dynamic range compressor which compresses a dynamic range based on the original image data for generating dynamic range compressed image data; a luminance signal generator which generates a luminance signal including an infrared wavelength component based on the dynamic range compressed image data; a color signal data generator which generates color signal data based on a visible wavelength component in the original image data; a color-difference signal generator which generates a color-difference signal based on the color signal data; and a color image generator which generates a color image based on the luminance signal and the color-difference signal.

Advantageous Effects of Invention

The invention is directed to an imaging device provided with an imaging optical system, an imaging element, and an image processing section. The imaging device is configured in such a manner that original image data including at least three types of original image components is obtained by using the imaging element which has a sensitive wavelength region including an infrared wavelength region, and selectively including a visible wavelength region, and which is composed of at least three types of pixels having spectral sensitivities different from each other. The imaging device is configured to compress the dynamic range of the original image data including the three types of original image components, and to generate a color image based on a luminance signal including an infrared wavelength component that has been generated based on the compressed original image data, and based on a color-difference signal that has been generated based on the visible wavelength component in the original image data. With this configuration, it is possible to prevent lowering of saturation of a color signal resulting from compression of the dynamic range including an infrared wavelength component, and to obtain a clear color image having an enhanced S/N ratio at nighttime, and having a wide dynamic range.

BRIEF DESCRIPTION OF DRAWINGS

FIG. 1 is a block diagram showing a first embodiment of an imaging device of the invention;

FIG. 5 is a flowchart showing an operation to be performed by a pixel corrector in the image processing section;

FIGS. 8A through 8C are schematic diagrams showing a configuration and an operation of a fake color suppressor in the color processor;

DESCRIPTION OF EMBODIMENTS

Figure 2A:
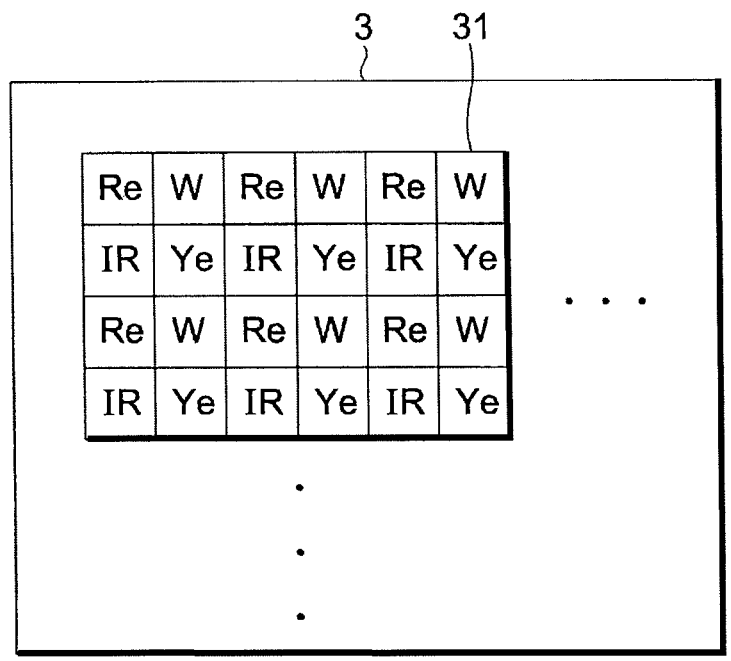
FIGS. 2A and 2B are schematic diagrams showing a configuration and a characteristic of an imaging element.

In the following, embodiments of the invention are described referring to the accompanying drawings. The invention is not limited to the following embodiments. In the drawings, portions substantially identical or equivalent to each other are indicated with the same reference signs, and repeated description thereof may be omitted, as necessary.

Firstly, a first embodiment of an imaging device of the invention is described referring to FIG. 1. FIG. 1 is a block diagram showing the first embodiment of the imaging device of the invention.

Referring to FIG. 1, the imaging device 1 is constituted of an imaging optical system 2, an imaging element 3, an image processing section 4, a control section 5, a storage section 6, a display section 7, and an interface section (hereinafter, called as I/F section) 8.

The imaging optical system 2 is constituted of a lens, and forms an image of a subject on an optical axis 21.

The imaging element 3 photoelectrically converts a subject image formed on the optical axis 21 by the imaging optical system 2, followed by analog-to-digital conversion (hereinafter, called as A/D conversion); and outputs digital original image data. The imaging element 3 will be described later in detail referring to FIG. 2A through FIG. 3. It is desirable that a subject be at least illuminated or irradiated with infrared light.

The image processing section 4 performs an image processing to original image data outputted from the imaging element 3 under the control of the control section 5 to be described later, and outputs a color image. The configuration and the operation of the image processing section 4 will be described later referring to FIG. 4 through FIG. 8C.

The control section 5 is constituted of e.g. a CPU. The control section 5 controls the operation of the imaging device 1 in accordance with a program stored in the storage section 6 to be described later, and communicates with an external system to be connected to the imaging device 1 via the I/F section 8.

The storage section 6 is constituted of e.g. an ROM and an RAM. The storage section 6 stores a program that defines an operation of a CPU constituting the control section 5, stores and outputs a color image outputted from the image processing section 4 under the control of the control section 5, and stores and outputs e.g. adjustment data relating to the respective parts of the imaging device 1.

The display section 7 displays a color image stored in the storage section 6 under the control of the control section 5.

The I/F section 8 performs communication between the imaging device 1 and the external system under the control of the control section 5.

Figure 2B:
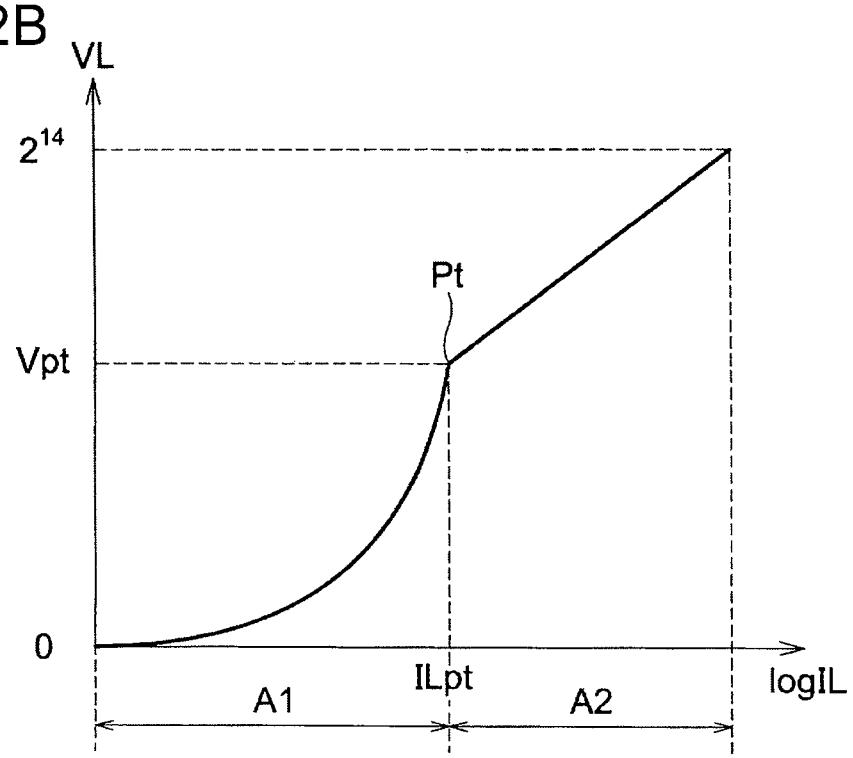

Next, a configuration and a characteristic of the imaging element 3 are described referring to FIGS. 2A and 2B. FIGS. 2A and 2B are schematic diagrams showing a configuration and a characteristic of the imaging element 3. FIG. 2A is a schematic diagram showing an optical filter arrangement of the imaging element 3, and FIG. 2B is a schematic diagram showing a photoelectric conversion characteristic of the imaging element 3.

Referring to FIG. 2A, the imaging element 3 is a linear-log sensor. The imaging element 3 has a number of pixels 31 arranged in a two-dimensional matrix. The imaging element 3 is configured in such a manner that four types of pixels 31 i.e. pixels 31, in each of which one of three types of filters i.e. a yellow (Ye) filter, a red (Re) filter, and an infrared transmissive (IR) filter is provided, and pixels 31, in which no filter (to simplify the description, called as a W filter) is provided, are regularly arranged.

In the example shown in FIG. 2A, pixels 31 provided with Re filters, and pixels 31 provided with W filters are alternately arranged in a certain row, and pixels 31 provided with IR filters and pixels 31 provided with Ye filters are alternately arranged in a row succeeding the certain row. The above pattern is alternately repeated with respect to each row. The filter arrangement, however, is not limited to the above.

Figure 3:
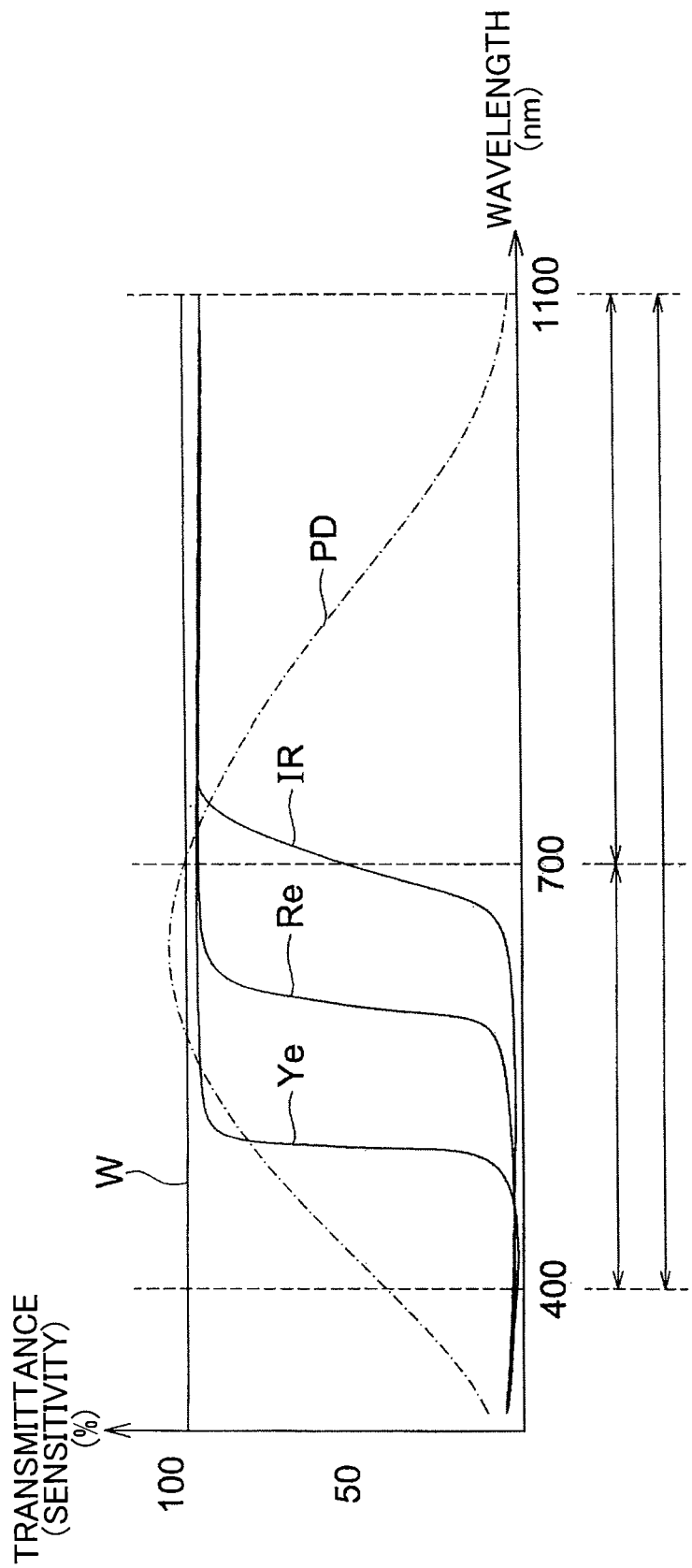
FIG. 3 is a schematic diagram showing a spectral characteristic of each filter, and a spectral sensitivity characteristic of a photodiode in the imaging element.

FIG. 3 shows an example of the spectral characteristic of the imaging element 3. FIG. 3 is a schematic diagram showing an example of the spectral characteristic of each filter, and an example of the spectral sensitivity characteristic of a photodiode PD in the imaging element 3.

Referring to FIG. 3, the Ye filters transmit light in a wavelength region other than the blue wavelength region in the visible wavelength region, and transmit light in the infrared wavelength region; the Re filters transmit light in a wavelength region other than the blue wavelength region and the green wavelength region in the visible wavelength region, and transmit light in the infrared wavelength region; the IR filters transmit light in the infrared wavelength region; and the W filters transmit light in the visible wavelength region, and transmit light in the infrared wavelength region. To simplify the description, IR and W are also called as colors.

On the other hand, the photodiode PD in the imaging element 3 has a sensitivity in the range from about 300 nm to 1,100 nm, and has a sensitivity peak from about 650 nm to 700 nm. The sensitivity range and the sensitivity peak vary depending on the structures of photodiodes PD, impurity concentrations, and the like.

In view of the above, pixels 31 (hereinafter, called as Ye pixels. The same definition is also applied to the respective color pixels) provided with Ye filters in the imaging element 3 have a sensitive wavelength region in the range from the green wavelength region in the visible wavelength region to 1,100 nm in the infrared wavelength region. The Re pixels have a sensitive wavelength region in the range from the red wavelength region in the visible wavelength region to 1,100 nm in the infrared wavelength region. The IR pixels have a sensitive wavelength region in the range from 700 nm to 1,100 nm in the infrared wavelength region. The W pixels have a sensitive wavelength region in the range from 300 nm to 1,100 nm.

As described above, use of the filters having such spectral sensitivities as to receive photons as much as possible is advantageous in reducing shot noise generated in a photodiode.

Referring to FIG. 2B, the axis of abscissas of the graph indicates an incident light amount IL of light to be entered to a pixel 31 in the imaging element 3 as a logarithmic axis, and the axis of ordinate of the graph indicates an output VL after A/D conversion of an output from the pixel 31. Each pixel 31 in the imaging element 3 shows a linear-log characteristic such that each pixel 31 has a linear characteristic in a low luminance region A1 where the incident light amount IL is smaller than the one at an inflection point Pt, and that each pixel 31 has a logarithmic characteristic in a high luminance region A2 where the incident light amount IL is larger than the one at the inflection point Pt. Thus, each pixel has a wide dynamic range (hereinafter, called as a D-range).

Practically, however, the linear characteristic and the logarithmic characteristic are not completely switched over with respect to the inflection point Pt. In the vicinity of the inflection point, there is a region having a transient characteristic which is neither a linear characteristic nor a logarithmic characteristic. This transient characteristic is called as a linear-log transient characteristic, and the region having the transient characteristic is called as a linear-log transient region. The linear-log transient region is disclosed in e.g. JP 2007-251898A. Further, the configuration and the driving method of a pixel 31 in an imaging element 3, and the adjusting method of the inflection point Pt of a linear-log characteristic are described in detail in many documents including the aforementioned patent literature 1.

Further, the imaging element 3 is internally provided with an A/D converter. The imaging element 3 outputs original image data D3 constituted of the respective color image components i.e. Ye image component, Re image component, Ir image component, and W image component each having a linear-log characteristic of e.g. 14 bits. The A/D converter may be provided outside of the imaging element 3 or may be provided inside of the control section 5.

Figure 4:
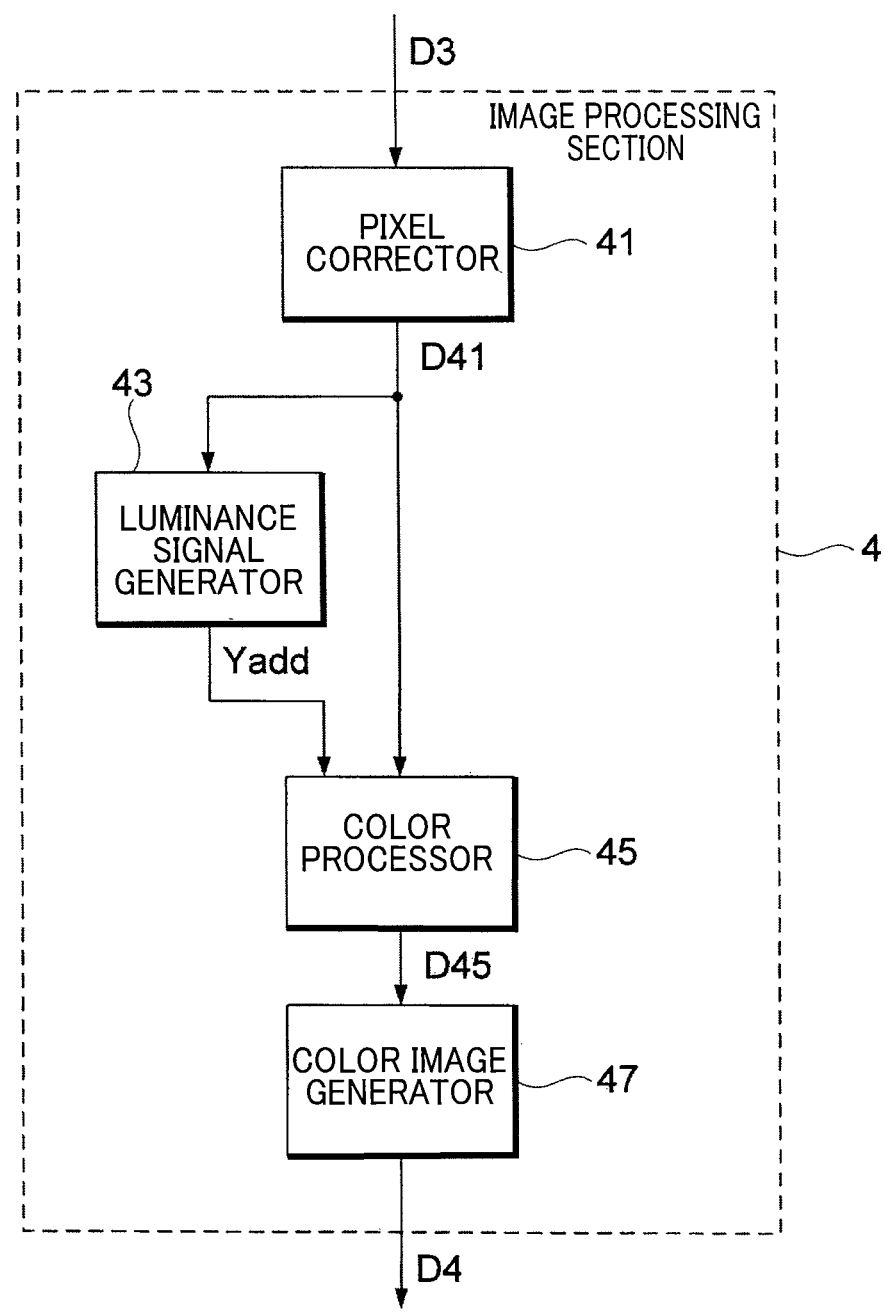
FIG. 4 is a block diagram showing a configuration of an image processing section.

Next, a configuration of the image processing section 4 is described referring to FIG. 4. FIG. 4 is a block diagram showing a configuration of the image processing section 4.

Referring to FIG. 4, the image processing section 4 is constituted of a pixel corrector 41, a luminance signal generator 43, a color processor 45, and a color image generator 47. Each of the parts in the image processing section 4 may be constituted of a hardware component; may be constituted of a CPU and a software component; or may be constituted of combination of a hardware component, and a CPU and a software component.

The pixel corrector 41 performs various processings such as black offset correction, inflection point correction, conversion of a linear-log characteristic into a logarithmic characteristic, defect pixel correction, and exposure correction with respect to the original image data D3 outputted from the imaging element 3; and outputs pixel corrected image data D41. The pixel corrected image data D41 is constituted of Ye image component, Re image component, IR image component, and W image component each having a logarithmic characteristic of 16 bits. The details of the operation to be performed by the pixel corrector 41 will be described referring to FIG. 5.

The luminance signal generator 43 acquires second corrected image data D43 constituted of Ye image component, Re image component, IR image component, and W image component each having a linear characteristic of 12 bits by performing various processings such as D-range compression, conversion of a logarithmic characteristic into a linear characteristic, and color pixel interpolation with respect to the pixel corrected image data D41 outputted from the pixel corrector 41; and generates a luminance signal Yadd from the second corrected image data D43. The luminance signal Yadd is data having a linear characteristic of 12 bits. The details of the operation to be performed by the luminance signal generator 43 will be described referring to FIGS. 6A and 6B.

The color processor 45 performs various processings which are the improved processings with respect to the method disclosed in patent literature 3, with use of the luminance signal Yadd outputted from the luminance signal generator 43, and the pixel corrected image data D41 outputted from the pixel corrector 41; and outputs a color signal D45. The color signal D45 is constituted of the respective image components i.e. red (R) image component, green (G) image component, and blue (B) image component each having a linear characteristic of 8 bits. The details of the operation to be performed by the color processor 45 will be described referring to FIG. 7 through FIG. 8C.

The color image generator 47 performs various processings such as white balance correction, color correction, gamma correction, color space conversion, and edge emphasis with respect to the color signal D45 outputted from the color processor 45, and outputs a color image D4. The color image D4 is constituted of a luminance signal Y4, and color-difference signals Cb4 and Cr4 each having a linear characteristic of 8 bits. The details of the operation to be performed by the color image generator 47 will be described referring to FIG. 9.

FIG. 5 is a flowchart showing an operation to be performed by the pixel corrector 41 in the image processing section 4.

Referring to FIG. 5, in Step S411, black level offset correction is performed with respect to the original image data D3 outputted from the imaging element 3 pixel by pixel, whereby black corrected original image data D411 (Ye1, Re1, IR1, W1) is generated. The offset value of each pixel is measured in advance, and stored in the storage section 6. The black offset correction is described in detail in e.g. JP 2005-079766A.

In Step S413, the photoelectric conversion characteristic of the black corrected original image data D411 which has undergone the black offset correction in Step S411 is converted from a linear-log characteristic into a reference logarithmic characteristic, whereby logarithmic original image data D413 (Ye2, Re2, IR2, W2) is generated. The logarithmic original image data D413 is data having a logarithmic characteristic of 16 bits.

The characteristic conversion is performed by dividing the linear-log characteristic into three characteristic regions i.e. a linear characteristic, a linear-log transient characteristic which is a transient characteristic in the vicinity of the inflection point, and a logarithmic characteristic, and with respect to each of the characteristic regions. By the characteristic conversion, variation of the inflection point in each pixel is also corrected. The characteristic conversion is described in detail in e.g. JP 2007-074488A and JP 2007-251898A.

Alternatively, the characteristic conversion may be performed, as necessary, by further dividing the logarithmic characteristic into two characteristic regions i.e. a first logarithmic characteristic and a second logarithmic characteristic having gradients different from each other, in other words, by dividing the linear-log characteristic into four characteristic regions.

In Step S415, defect pixel correction is performed with respect to the logarithmic original image data D413 at a defect pixel position, whereby defect corrected original image data D415 (Ye3, Re3, IR3, W3) is generated. The defect pixel correction may be performed by a well-known method using e.g. a digital camera, such as a method for performing linear interpolation with use of pixel data of pixels having the same color as a target pixel and disposed adjacent to the target pixel.

In Step S417, a gain capable of setting the average value of each data of the defect corrected original image data D415 to a predetermined value is calculated, and the defect corrected original image data D415 is multiplied by the calculated gain, whereby pixel corrected image data D41 (Ye4, Re4, IR4, W4) is generated. By performing the above operations, a dark portion of an image is reproduced without underexposure.

Figure 6A:
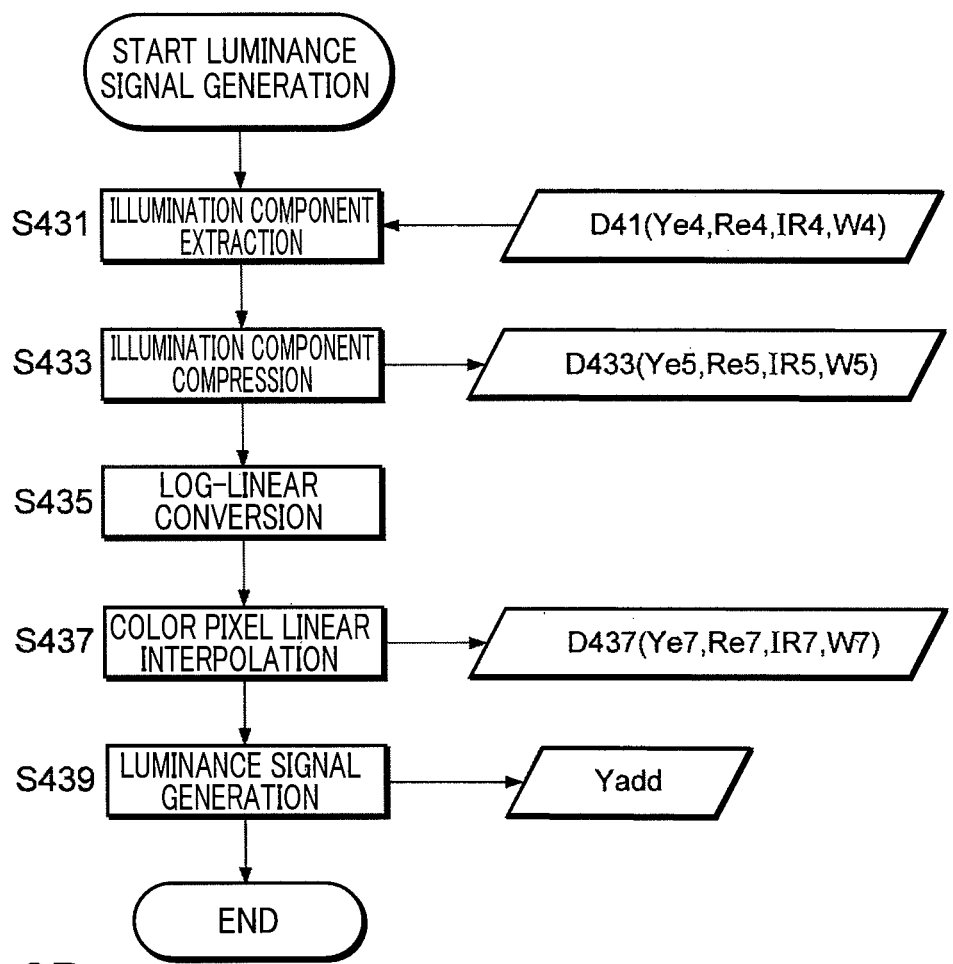
FIGS. 6A and 6B are schematic diagrams respectively showing an operation and a configuration of a luminance signal generator in the image processing section.
Figure 6B:
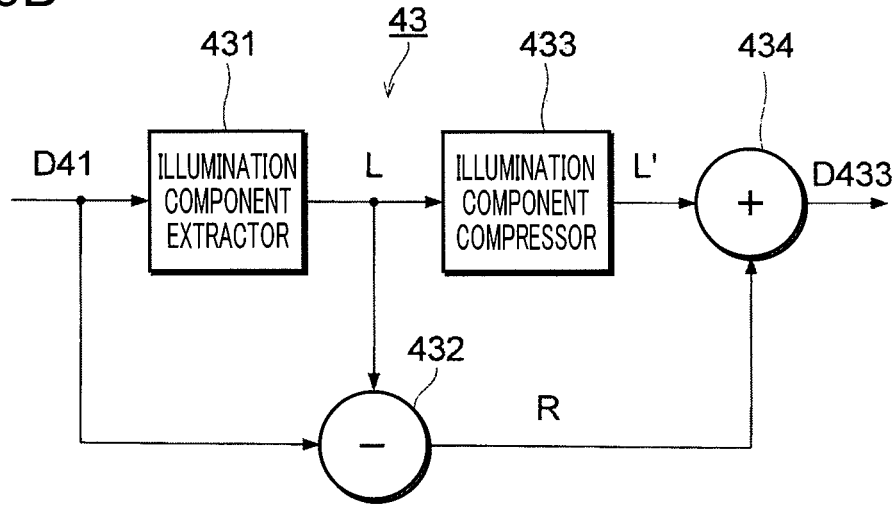

FIGS. 6A and 6B are schematic diagrams showing an operation and a configuration of the luminance signal generator 43 in the image processing section 4. FIG. 6A is a flowchart showing the operation to be performed by the luminance signal generator 43, and FIG. 6B is a block diagram showing a configuration of an illumination component extractor and an illumination component compressor in the luminance signal generator 43. Here, the luminance signal generator 43 also functions as a dynamic range compressor.

Referring to FIG. 6A, in Step S431, an illumination component L of the pixel corrected image data D41 is extracted, and a reflectance component R is obtained by subtracting the illumination component L from the pixel corrected image data D41.

In Step S433, a compressed illumination component L' is generated by compressing the illumination component L, and the compressed illumination component L' and the reflectance component R are summed up, whereby D-range compressed image data D433 (Ye5, Re5, IR5, W5) including a compressed illumination component, in other words, including a compressed D-range is generated.

The operations of Steps S431 and S433 are performed by the configuration shown in FIG. 6B. Referring to FIG. 6B, the illumination component extractor 431 is constituted of e.g. a hierarchical low-pass filter, and extracts, as the illumination component L, a low frequency component in the inputted pixel corrected image data D41. The illumination component compressor 433 is constituted of e.g. a multiplier, and obtains the compressed illumination component L' by multiplying the illumination component L with a predetermined Gdrc. Here, the compressed illumination component L' is expressed by the following equation (1).

$$L' = L \times Gdrc \quad (1)$$

On the other hand, the reflectance component R is obtained by subtracting the illumination component L from the pixel corrected image data D41 by a subtractor 432. Summing up the compressed illumination component L' and the reflectance component R by an adder 434 generates the D-range compressed image data D433 including a compressed illumination component, in other words, including a compressed D-range. Compressing an illumination component is advantageous in compressing the entirety of a D-range while keeping a local contrast. The D-range compression is described in detail in e.g. JP 2001-275015A and JP 2009-081526A.

Referring back to FIG. 6A, in Step S435, the D-range compressed image data D433 which has undergone D-range compression of a logarithmic characteristic is converted into linear D-range compressed image data D435 (Ye6, Re6, IR6, W6) having a linear characteristic. The conversion is performed by a predetermined conversion table. The D-range compressed image data D433 which has undergone D-range compression of a logarithmic characteristic of 16 bits is converted into linear D-range compressed image data D435 having a linear characteristic of 12 bits.

In Step S437, a defect portion of each of Ye image component, Re image component, IR image component, and W image component is subjected to interpolation at each pixel position in the linear D-range compressed image data D435, whereby color pixel interpolated image data D437 (YE7, Re7, IR7, W7) is generated. The interpolation may be performed by a well-known method using e.g. an ordinary digital camera, such as a method for performing linear interpolation with use of pixel data of pixels having the same color as a target pixel and disposed adjacent to the target pixel.

In Step S439, the image components at each pixel in the color pixel interpolated image data D437 are summed up and averaged, whereby a luminance signal Yadd in a color space of the original image data D3 to be subjected to image processing is generated. Here, the luminance signal Yadd is expressed by the following equation (2).

$$Yadd=(Ye7+Re7+IR7+W7)/4 \quad (2)$$

The luminance signal Yadd is a luminance signal obtained by summing up signals which have undergone D-range compression, based on the original image data D3 including an infrared component. As described above, since a luminance component which visually stands out at the time of displaying an image is generated merely by summation, the above configuration is advantageous in reducing noise. Further, in the case where the intensity of infrared light is strong as compared with visible light, it is possible to obtain a high-resolution image by using the luminance signal Yadd. The luminance signal generator 43 functions as a luminance signal generator in the invention by performing the operation of Step S439.

The luminance signal Yadd may be obtained by applying a weight to each of the image components at each pixel in the color pixel interpolated image data D437, followed by summation. Here, the luminance signal Yadd is expressed by the following equation (2').

$$Yadd=(a1 \times Ye7+a2 \times Re7+a3 \times IR7+a4 \times W7)/4 \quad (2')$$

where a1, a2, a3, a4 is a weighting coefficient, and a1+a2+a3+a4=1. The weighting coefficients may be e.g. a predetermined value.

Figure 7:
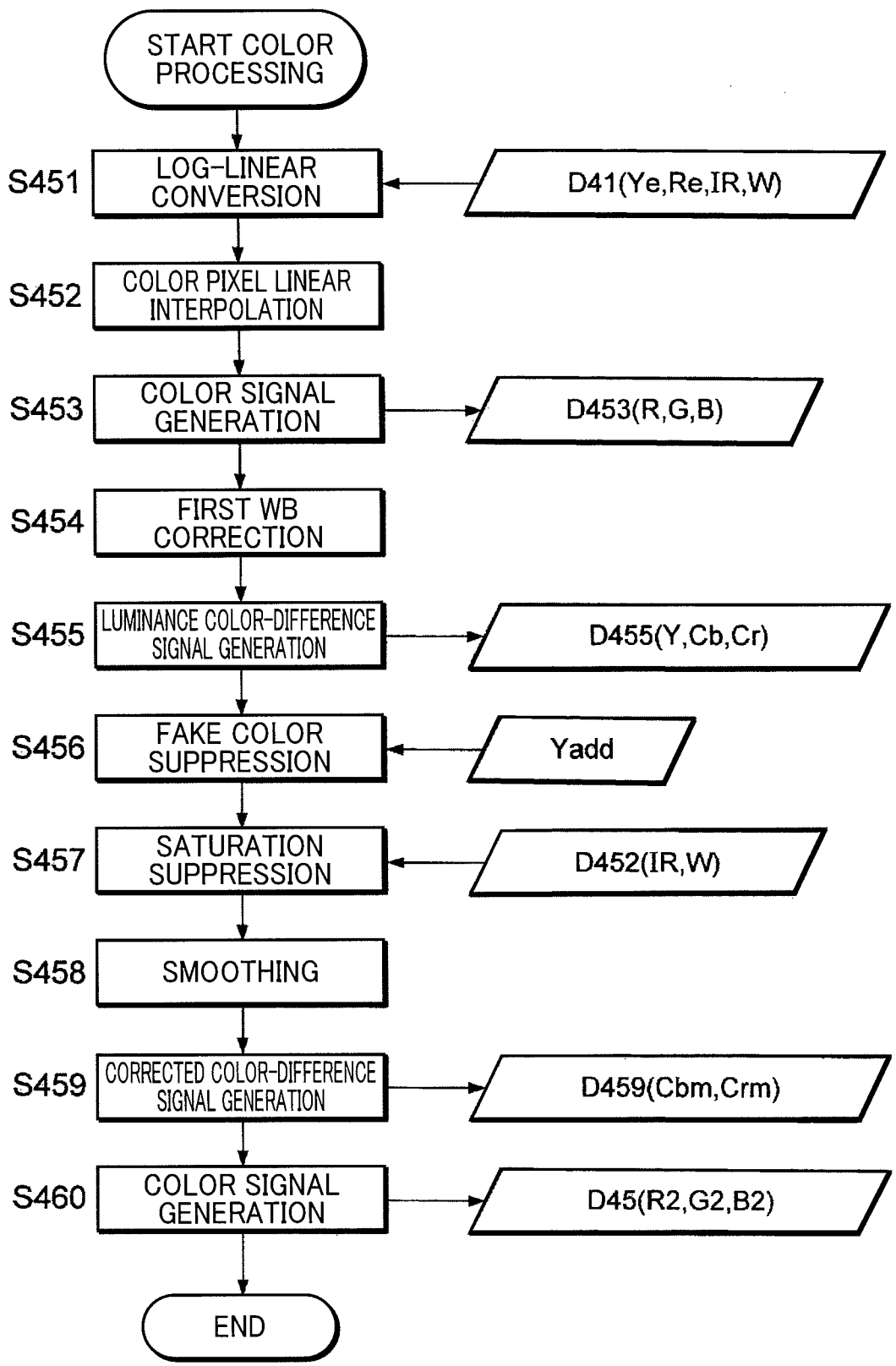
FIG. 7 is a flowchart showing an operation to be performed by a color processor in the image processing section.

FIG. 7 is a flowchart showing an operation to be performed by the color processor 45 in the image processing section 4. In this example, the color processor 45 functions as a color signal generator and a color-difference signal generator. Here, the color processor 45 also functions as a color signal data generator and a color-difference signal generator.

Referring to FIG. 7, in Step S451, the pixel corrected image data D41 is converted into data having a linear characteristic of 32 bits by applying a predetermined conversion table to the pixel corrected image data D41 which has a logarithmic characteristic of 16 bits and which has been generated by the pixel corrector 41, whereby linear image data D451 (Ye8, Re8, IR8, W8) is obtained.

In Step S452, a defect portion of each of Ye image component, Re image component, IR image component, and W image component at each pixel position in the linear image data D451 is subjected to interpolation, whereby interpolated image data D452 (Ye9, Re9, IR9, W9) is generated. The interpolation may be performed by a well-known method using e.g. an ordinary digital camera, such as a method for performing linear interpolation with use of pixel data of pixels having the same color as a target pixel and disposed adjacent to the target pixel.

In Step S453, each of color signals of red (R), green (G), and blue (B), which are color signals representing visible light, is calculated from the interpolated image data D452, whereby color signal data D453 (R, G, B) is obtained. The computation equations for generating the respective color signals are expressed by the following equations (3-1), (3-2), and (3-3).

$$R=Re9-IR9 \quad (3-1)$$

$$G=Ye9-Re9 \quad (3-2)$$

$$B=W9-Ye9 \quad (3-3)$$

In the case where the computation result shows a minus value, the computation result is replaced by 0 (zero).

The color signal data D453 is a signal obtained by extracting, from the original image data D3 including an infrared component, only a visible light component in the interpolated image data D452 which has undergone color pixel interpolation. The interpolated image data D452 is not subjected to D-range compression.

The above processing is performed to prevent the following drawback. If a color signal is generated with use of a signal obtained by subjecting original image data including an infrared component, e.g. the color pixel interpolated image data D437 generated in Step S437, to D-range compression, such a color signal will be a signal generated based on the D-range compressed signal, regardless of the D-range of the visible light component in the original image data. This may lower the saturation of the color signal.

In Step S454, in order to obtain white balance (hereinafter, called as WB) of the color signal data D453 including distortion resulting from the aforementioned processings, the color signal data D453 (R, G, B) is multiplied by a predetermined first WB gain (gr, gg, gb), whereby first WB corrected color signal D454 (R1, G1, B1) is generated. Here, the first WB corrected color signal D454 (R1, G1, B1) is expressed by the following equations (4-1), (4-2), and (4-3).

$$R1=R \times gr \quad (4-1)$$

$$G1=G \times gg \quad (4-2)$$

$$B1=B \times gb \quad (4-3)$$

The first WB gain (gr, gg, gb) may be stored in advance in the storage section 6.

In Step S455, a luminance color-difference signal D455 (Y, Cb, Cr) is generated by obtaining a visible luminance signal Y, and color-difference signals Cb and Cr by computations with use of the first WB corrected color signal D454. The computation equations are expressed by the following equations (5-1), (5-2), and (5-3).

$$Y=0.299 \times R1+0.587 \times G1+0.114 \times B1 \quad (5-1)$$

$$Cb=-0.169 \times R1-0.331 \times G1+0.500 \times B1 \quad (5-2)$$

$$Cr=0.500 \times R1-0.419 \times G1-0.081 \times G1 \quad (5-3)$$

Here, the color signal data D453 obtained in Step S453 is data including only a visible light component. In view of the above, Step S491 may be provided after Step S453, and a D-range compressed color signal may be generated by subjecting the color signal data D453 to D-range compression substantially in the same manner as in Steps S431 and S433. In the modification, the processing of Step S491 corresponds to a dynamic range compressed color signal generator.

Further, the luminance color-difference signal D455 obtained in Step S455 is data including only a visible light component. In view of the above, Step S492 may be provided after Step S455, and a D-range compressed color-difference signal may be generated by subjecting the luminance color-difference signal D455 to D-range compression substantially in the same manner as in Steps S431 and S433. In the modification, the processing of Step S492 corresponds to a dynamic range compressed color-difference signal generator.

In any of the cases, it is possible to compress the entirety of a D-range while keeping a local contrast by subjecting an illumination component to D-range compression. Thus, the above configuration is advantageous in reducing the data size, and in facilitating the computations thereafter.

In Step S456, color-difference signals Cb' and Cr', in which fake color generation in an edge portion of an original image is suppressed, is generated from the color-difference signals Cb and Cr in the luminance color-difference signal D455, and from the luminance signal Yadd obtained in Step S439 in FIG. 6A. The details of the above processing will be described referring to FIG. 8A through FIG. 8C.

FIGS. 8A through 8C are schematic diagrams showing a configuration and an operation of a fake color suppressor 456 in the color processor 45 corresponding to Step S456 in FIG. 7. FIG. 8A is a block diagram showing a configuration of the fake color suppressor 456, FIG. 8B is a configuration diagram of a filter to be used in the fake color suppressor 456, and FIG. 8C is a graph showing a coefficient to be used in the fake color suppressor 456.

Referring to FIG. 8A, the fake color suppressor 456 is constituted of two functional blocks i.e. a luminance high-frequency detector 456a and a color-difference signal modulator 456b.

The luminance high-frequency detector 456a calculates an edge amount Yedge by applying a Prewitt filter (horizontal direction component: gHS, vertical direction component: gVS) shown in FIG. 8B to the luminance signal Yadd generated in Step S439 of FIG. 6A for detecting an edge portion of the original image. Here, the edge amount Yedge is expressed by the following equation (6).

$$Yedge = |gHS \times Yadd| + |gVS \times Yadd| \tag{6}$$

Then, a luminance high-frequency signal Y'edge is calculated from the edge amount Yedge, and is outputted to the color-difference signal modulator 456b. Here, the luminance high-frequency signal Y'edge is expressed by the following equation (7).

$$Y'edge = Yedge/(Yadd \times 9) \tag{7}$$

There is a case that the luminance high-frequency signal Y'edge is one or larger.

On the other hand, the color-difference signal modulator 456b specifies a fake color suppressing coefficient "k" shown in FIG. 8C, based on the luminance high-frequency signal Y'edge generated by the luminance high-frequency detector 456a.

In the case where Y'edge<threshold value $\alpha$, $k=1$, in the case where the threshold value $\alpha \leq$ Y'edge $\leq$ threshold value $\beta$, $k = -Y'edge/(\beta-\alpha) - \beta/(\beta-\alpha)$, and in the case where $\beta$/Y' edge, $k=0$.

The threshold values $\alpha$ and $\beta$ may be determined in advance according to the types or purposes of use of an image, and may be stored in the storage section 6.

Modulating the color-difference signals Cb and Cr of the luminance color-difference signal D455 generated in Step S455 in FIG. 7, with use of the fake color suppressing coefficient "k" obtains a modulated color-difference signal D456 (Cb1, Cr1) in which a color signal component in an edge portion is suppressed. Here, the modulated color-difference signal D456 (Cb1, Cr1) is expressed by the following equations (8-1) and (8-2).

$$Cb1 = k \times Cb \tag{8-1}$$

$$Cr1 = k \times Cr \tag{8-2}$$

By performing the above processing, it is possible to suppress fake color generation in an edge portion of the original image, resulting from the optical filter arrangement of the imaging element 3. Further, performing the fake color suppression in Step S456 prior to a smoothing processing in Step S458 to be described later is more advantageous in suppressing fake color generation in an edge portion.

Referring back to FIG. 7, the modulated color-difference signal D456 is multiplied by a predetermined coefficient vb, yr in accordance with the amount of visible light relative to infrared light, for preventing an excessive increase in the saturation of an image in the case where the visible light component is small as compared with the infrared component, whereby a saturation suppressed color-difference signal D457 (Cb2, Cr2) in which saturation of the modulated color-difference signal D456 is suppressed in accordance with the amount of visible light relative to the infrared light, is generated. Here, the saturation suppressed color-difference signal D457 (Cb2, Cr2) is expressed by the following equations (9-1) and (9-2).

$$Cb2 = Cb1 \times vb \tag{9-1}$$

$$Cr2 = Cr1 \times vr \tag{9-2}$$

The amount of visible light component can be obtained based on a difference (W−IR) between W image component and IR image component in the interpolated image data D452 obtained in Step S452, or a ratio (W/IR) between W image component and IR image component. Alternatively, the predetermined coefficient (vb, vr) may be prepared in advance in the format of a lookup table (hereinafter, called as LUT) in accordance with e.g. a difference or a ratio between W image component and IR image component, and may be stored in the storage section 6.

In Step S458, a smoothing processing is performed by applying a low-pass filter of a relatively small size e.g. a 3×3 or 5×5 low-pass filter to the saturation suppressed color-difference signal D457 (Cb2, Cr2) obtained in Step S457 for noise reduction in the unit of pixels, whereby a color-difference low frequency signal Cbs, Crs in which a noise component is suppressed and the S/N ratio is enhanced, is obtained.

Noise may increase, because subtraction is performed in the color signal computation in Step S453. However, noise is reduced by the smoothing processing in Step S458. Furthermore, there is no likelihood that an image after the smoothing processing may look unclear or obscure thanks to the visual characteristics of human eyes.

Likewise, a smoothing processing is performed by applying a low-pass filter of a relatively small size e.g. a 3×3 or 5×5 low-pass filter to the visible luminance signal Y of the luminance color-difference signal D455 of visible light, which has been obtained in Step S455, whereby a visible luminance low frequency signal Ys in which a low frequency component in the visible luminance signal Y is extracted, is extracted.

In Step S459, the color-difference low frequency signals Cbs and Crs are corrected based on the luminance signal Yadd including light in the infrared wavelength region that has been generated in Step S439 of FIG. 6A, and the visible luminance signal Y, whereby a corrected color-difference signal D459 (Cbm, Crm) is generated. Matching the space frequency regions between luminance and color in correction is advantageous in preventing fake color generation in e.g. an edge portion where the luminance difference is large.

In view of the above, the space frequency regions between luminance and color are matched with each other not only by performing correction by the equation: Cbm=Cbs×(Yadd/Y), but also by convoluting a high luminance component with use of the aforementioned correction term. The high luminance component is extracted by obtaining a ratio (Y/Ys) between a visible luminance signal Y including a high frequency component and a low frequency component of luminance of visible light, and a visible luminance low frequency signal Y including only a low frequency component. Here, the corrected color-difference signal D459 (Cbm, Crm) is expressed by the following equations (10-1) and (10-2).

$$Cbm = Cbs \times (Yadd/Y) \times (Y/Ys) \quad (10\text{-}1)$$

$$Crm = Crs \times (Yadd/Y) \times (Y/Ys) \quad (10\text{-}2)$$

The color-difference low frequency signal Cbs, Crs is a signal having a linear characteristic of 12 bits.

Alternatively, the following equations (10-1') and (10-2') obtained by erasing the visible luminance signal Y from the equations (10-1) and (10-2) by cancelling down the visible luminance signal Y may be used.

$$Cbm = Cbs \times (Yadd/Ys) \quad (10\text{-}1')$$

$$Crm = Crs \times (Yadd/Ys) \quad (10\text{-}2')$$

As described above, it is possible to calculate a color-difference signal and a luminance signal in a color space to be subjected to conversion in a well-balanced manner by obtaining the corrected color-difference signal D459, based on the luminance signal Yadd including light in the infrared wavelength region and the visible luminance signal Y, or based on a luminance low frequency signal Yadds and the visible luminance low frequency signal Ys.

Further, the space frequency regions between a luminance signal and a color signal are matched with each other by convoluting a high frequency component extracted from a luminance component in order to obtain the corrected color-difference signal D459. This is advantageous in suppressing fake color generation in e.g. an edge portion where the luminance difference is large.

In Step S460, a color signal D45 (R2, G2, B2) is calculated from the corrected color-difference signal D459 (Cbm, Crm) obtained in Step S459, and from the luminance signal Yadd generated in Step S439 of FIG. 6A. The computation equations for generating the color signal D45 (R2, G2, B2) is expressed by the following equations (11-1), (11-2), and (11-3).

$$R2 = Yadd + 1.402 \times Crm \quad (11\text{-}1)$$

$$G2 = Yadd - 0.344 \times Cbm - 0.714 \times Crm \quad (11\text{-}2)$$

$$B2 = Yadd + 1.772 \times Cbm \quad (11\text{-}3)$$

The color signal D45 is data having a linear characteristic of 8 bits.

The color signal D45 (R2, G2, B2) is a signal obtained by the computation processings as described above. Accordingly, the color signal D45 is a color signal having significantly high precision, as compared with the color signal data D453 (R, G, B) that has been obtained by implementing subtraction with respect to the interpolated image data D452 in Step S453.

The equations (10-1) and (10-2), or the equations (10-1') and (10-2') may be formulated, even if the configuration does not include an infrared wavelength region. The configuration excluding an infrared wavelength region is a combination pattern of ordinary primary color filters or complementary color filters, and an infrared cut filter. For instance, there is proposed a configuration, in which pixels (called as Ye pixels) provided with yellow (Ye) filters, and pixels (called as W pixels) in which no filter is provided are alternately arranged in a certain row of an imaging element; pixels (Re pixels) provided with red (Re) filters and W pixels are alternately arranged in a row adjacent to the certain row; and the aforementioned pattern is alternately repeated with respect to each row, with infrared cut filters being arranged over the entirety of the combination.

The following patterns are proposed as pixel patterns other than the above.

1) Ye pixels and W pixels are alternately arranged in a certain row of an imaging element, and pixels (G pixels) provided with green filters and W pixels are alternately arranged in a row adjacent to the certain row;

2) Pixels (C pixels) provided with cyan filters and pixels (M pixels) provided with magenta filters are alternately arranged in a certain row of an imaging element, and Ye pixels and G pixels are alternately arranged in a row adjacent to the certain row; and 3) Re pixels and G pixels are alternately arranged in a certain row of an imaging element, and G pixels and pixels (B pixels) provided with blue (B) filters are alternately arranged in a row adjacent to the certain row.

The pixel patterns are not limited to the above examples.

In the case where conventional complementary color filters for visible light are used, it is possible to enhance the S/N ratio of luminance by obtaining an RGB image from a CMY image, and by converting a luminance obtained from the RGB image into a luminance after summation. However, in the case where the luminance after summation is converted into an RGB image again by the processing thereafter, a difference between the luminance and the luminance after summation may result in a difference in color.

However, by applying the aforementioned equations (10-1) and (10-2), or the equations (10-1') and (10-2'), the ratio between RGB colors can be kept. This is advantageous in enhancing the color reproducibility.

Figure 9:
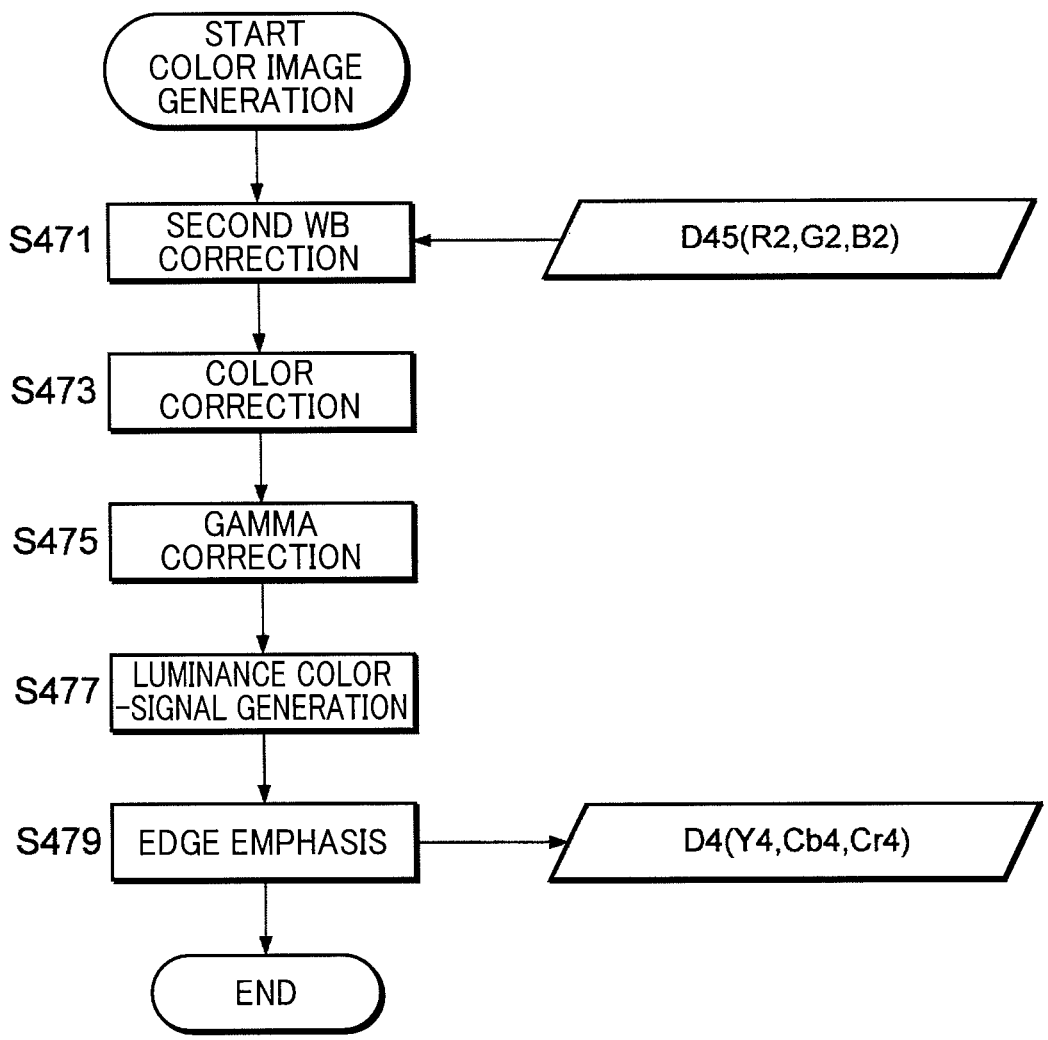
FIG. 9 is a flowchart showing an operation to be performed by a color image generator in the image processing section.

FIG. 9 is a flowchart showing an operation to be performed by the color image generator 47 in the image processing section 4.

Referring to FIG. 9, in Step S471, the color signal D45 (R2, G2, B2) obtained in Step S460 is multiplied by a predetermined second WB gain (gr2, gg2, gb2) for correcting the WB including distortion resulting from the processings after Step S454, whereby a second WB corrected color signal D471 (R3, G3, B3) is obtained. Here, the second WB corrected color signal D471 (R3, G3, B3) is expressed by the following equations (12-1), (12-2), and (12-3).

$$R3 = R2 \times gr2 \quad (12\text{-}1)$$

$$G3 = G2 \times gg2 \quad (12\text{-}2)$$

$$B3 = B2 \times gb2 \quad (12\text{-}3)$$

In Step S473, the second WB corrected color signal D471 is subjected to color correction, with use of a predetermined matrix, whereby a color corrected color signal D473 (R4, G4, B4) is generated. Here, the color corrected color signal D473 (R4, G4, B) is expressed by the following equation (13).

$$\begin{bmatrix} R4 \\ G4 \\ B4 \end{bmatrix} = \begin{bmatrix} Crr & Crg & Crb \\ Cgr & Cgg & Cgb \\ Cbr & Cbg & Cbb \end{bmatrix} \cdot \begin{bmatrix} R3 \\ G3 \\ B3 \end{bmatrix} \quad (13)$$

The predetermined matrix may be determined in advance, and may be stored in the storage section 6.

In Step S475, the color corrected color signal D473 is subjected to gamma correction in accordance with the gamma characteristic of an output device such as the display section 7 or an external display, whereby a gamma corrected color signal D474 (R5, G5, B5) is generated.

The gamma correction may be performed by converting the color corrected color signal D473 (R4, G4, B4) with use of a predetermined gamma correction LUT in accordance with the gamma characteristic of an output device such as the display section 7. Alternatively, the gamma correction may be performed in accordance with the standard of an ordinary display device such as the IEC 61966-2-1 sRGB standard.

In Step S477, a second luminance color-difference signal D477 (Y3, Cb3, Cr3) is generated by obtaining a luminance signal Y3 and color-difference signals Cb3 and Cr3 by computations with use of the gamma corrected color signal D474 (D5, G5, B5). The computation equations for generating the second luminance color-difference signal D477 (Y3, Cb3, Cr3) are expressed by the following equations (14-1), (14-2), and (14-3) in the same manner as in Step S455.

$$Y3 = 0.299 \times R5 + 0.587 \times G5 + 0.114 \times B5 \quad (14\text{-}1)$$

$$Cb3 = -0.169 \times R5 - 0.331 \times G5 + 0.500 \times B5 \quad (14\text{-}2)$$

$$Cr3 = 0.500 \times R5 - 0.419 \times G5 - 0.081 \times G5 \quad (14\text{-}3)$$

In Step S479, the second luminance color-difference signal D477 is subjected to edge emphasis, whereby a color image D4 (Y4, Cb4, Cr4) is generated and outputted from the image processing section 4. The color image D4 is constituted of signals each having a linear characteristic of 8 bits.

Figure 10:
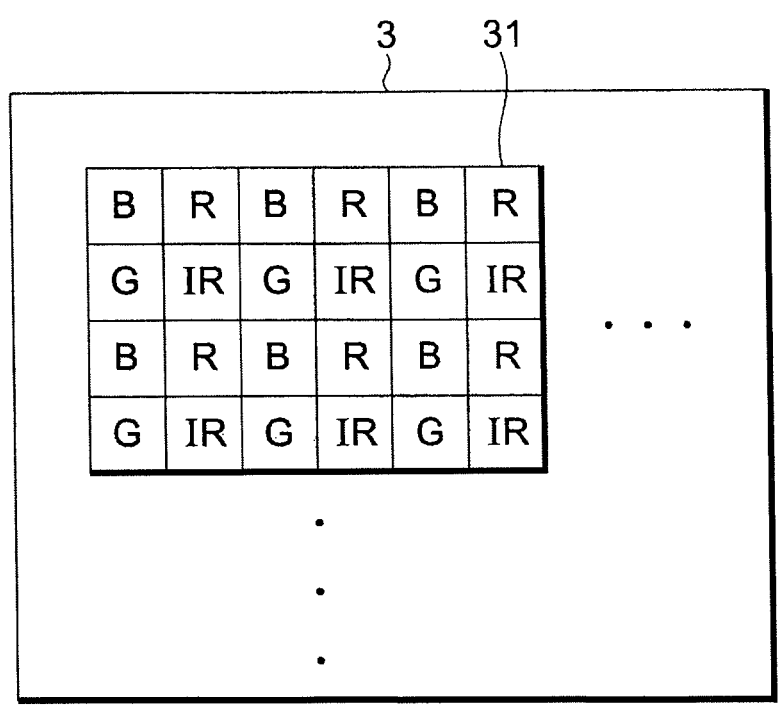
FIG. 10 is a schematic diagram showing a second example of the configuration of the imaging element.

The first embodiment as described above may also be applied to an imaging element having a configuration different from the configuration shown in FIG. 2. In the following, a second example of the configuration of the imaging element is described referring to FIG. 10 and FIG. 11. FIG. 10 is a schematic diagram showing the second example of the configuration of the imaging element.

Referring to FIG. 10, an imaging element 3 is a linear-log sensor substantially the same as the one shown in FIG. 2. The imaging element 3 has a number of pixels 31 arranged in a two-dimensional matrix. The imaging element 3 is configured in such a manner that pixels 31, in each of which one of four types of filters i.e. a blue (B) filter, a green (G) filter, a red (R) filter, and an infrared transmissive (IR) filter is provided, are regularly arranged.

In the example shown in FIG. 10, pixels 31 provided with B filters and pixels 31 provided with R filters are alternately arranged in a certain row, and pixels 31 provided with G filters and pixels 31 provided with IR filters are alternately arranged in a row succeeding the certain row. The above pattern is alternately repeated with respect to each row. The filter arrangement, however, is not limited to the above.

Figure 11:
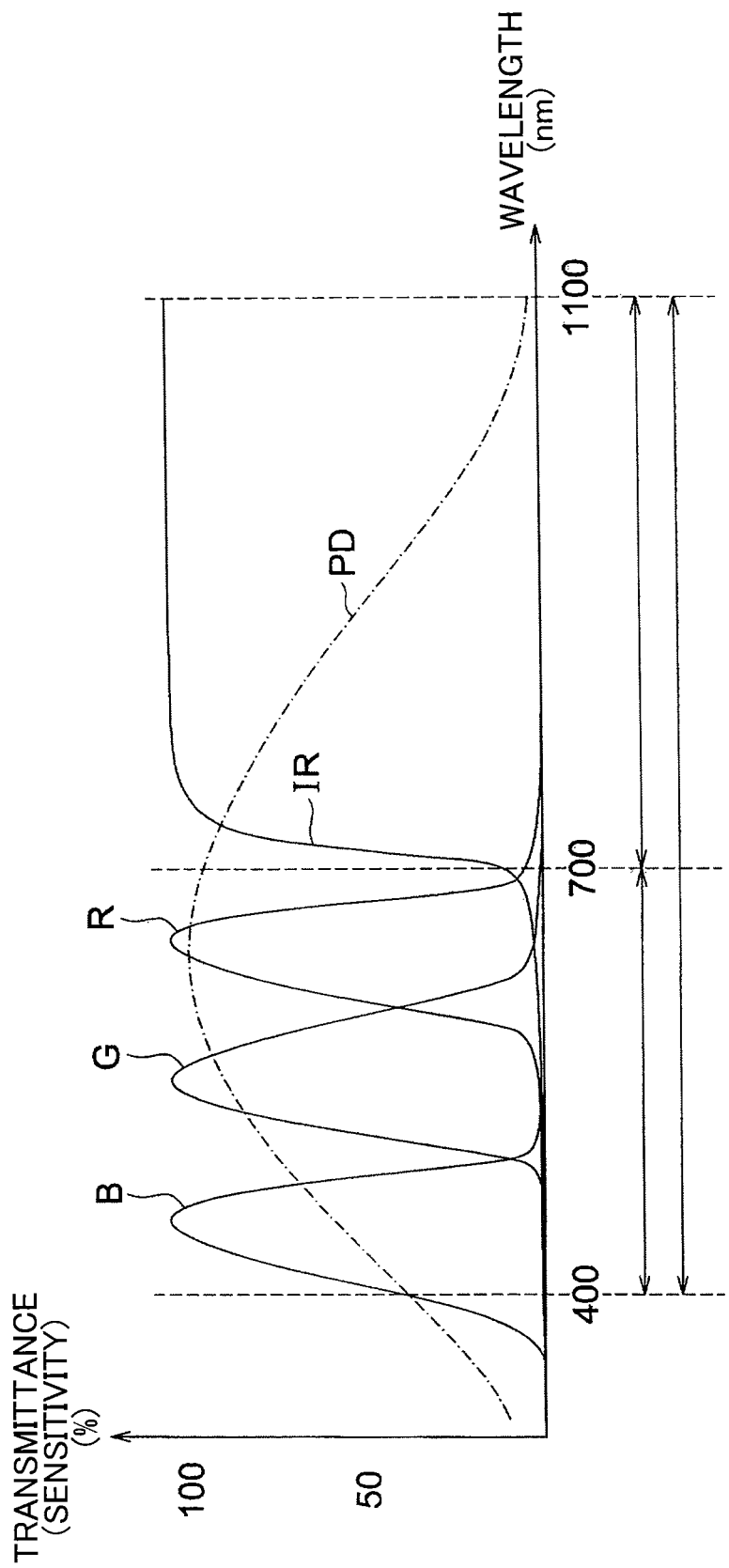
FIG. 11 is a schematic diagram showing a spectral characteristic of each filter, and a spectral sensitivity characteristic of a photodiode in the second example of the configuration of the imaging element.

FIG. 11 shows an example of the spectral characteristic of the imaging element 3. FIG. 11 is a schematic diagram showing the spectral characteristic of each filter, and the spectral sensitivity characteristic of a photodiode PD in the second example of the configuration of the imaging element 3.

Referring to FIG. 11, the B filters transmit light in the blue wavelength region in the visible wavelength region, the G filters transmit light in the green wavelength region in the visible wavelength region, the R filters transmit light in the red wavelength region in the visible wavelength region, and the IR filters transmit light in the infrared wavelength region. To simplify the description, IR is also called as a color.

On the other hand, the photodiode PD in the imaging element 3 has a sensitivity in the range from about 300 nm to 1,100 nm, and has a sensitivity peak from about 650 nm to 700 nm. The sensitivity range and the sensitivity peak vary depending on the structures of photodiodes PD, impurity concentrations, and the like.

In view of the above, pixels 31 (hereinafter, called as B pixels. The same definition is also applied to the respective color pixels) provided with B filters in the imaging element 3 have a sensitive wavelength region in the blue wavelength region in the visible wavelength region. The G pixels have a sensitive wavelength region in the green wavelength region in the visible wavelength region. The R pixels have a sensitive wavelength region in the red wavelength region in the visible wavelength region. The IR pixels have a sensitive wavelength region in the range from 700 nm to 1,100 nm in the infrared wavelength region.

In the case where the second example of the configuration of the imaging element 3 is used, it is necessary to modify the equation (2) and the equation (2') in Step S439, and modify the equation (3-1), the equation (3-2), and the equation (3-3) in Step S453 regarding color processing as follows, because the configuration of color filters is different from the example shown in FIG. 2. These equations are modified as follows.

$$Yadd = (B7 + G7 + R7 + IR7)/4 \quad (2)$$

$$Yadd = (a1 \times B7 + a2 \times G7 + a3 \times R7 + a4 \times IR7)/4 \quad (2')$$

$$R = R9 \quad (3\text{-}1)$$

$$G = G9 \quad (3\text{-}2)$$

$$B = B9 \quad (3\text{-}3)$$

Figure 12:
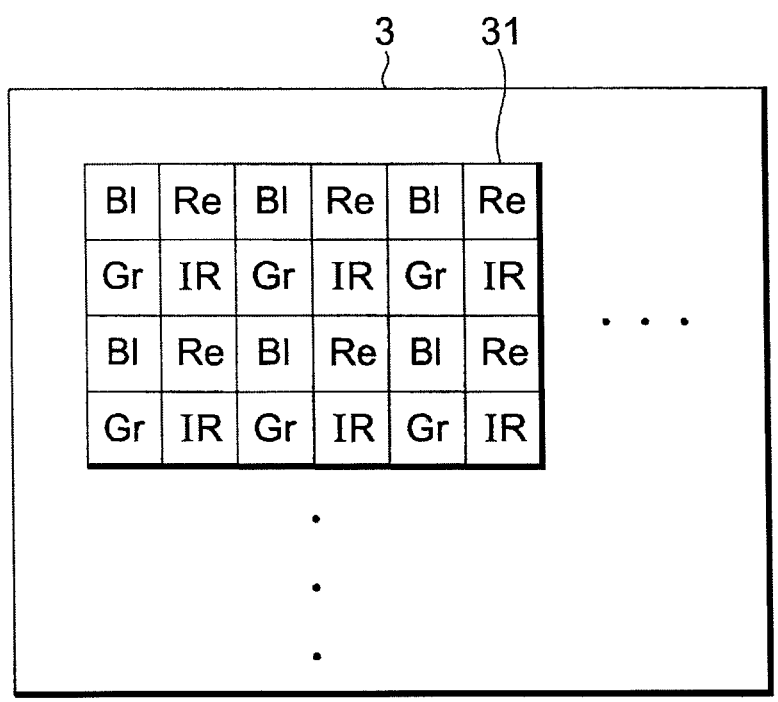
FIG. 12 is a schematic diagram showing a third example of the configuration of the imaging element.

In the following, a third example of the configuration of the imaging element is described referring to FIG. 12 and FIG. 13. FIG. 12 is a schematic diagram showing the third example of the configuration of the imaging element.

Referring to FIG. 12, the imaging element 3 is a linear-log sensor substantially the same as the one shown in FIG. 2. The imaging element 3 has a number of pixels 31 arranged in a two-dimensional matrix. The imaging element 3 is configured in such a manner that pixels 31, in each of which one of four types of filters i.e. a blue (Bl) filter, a green (Gr) filter, a red (Re) filter, and an infrared transmissive (IR) filter is provided, are regularly arranged. The reference signs representing the respective filters differ between the second example shown in FIG. 10 and the third example shown in FIG. 12, because the spectral sensitivities of the filters shown in FIG. 13 are different from those of the filters shown in FIG. 11.

In the example shown in FIG. 12, pixels 31 provided with Bl filters, and pixels 31 provided with Re filters are alternately arranged in a certain row, and pixels 31 provided with Gr filters and pixels 31 provided with IR filters are alternately arranged in a row succeeding the certain row. The above pattern is alternately repeated with respect to each row. The filter arrangement, however, is not limited to the above.

Figure 13:
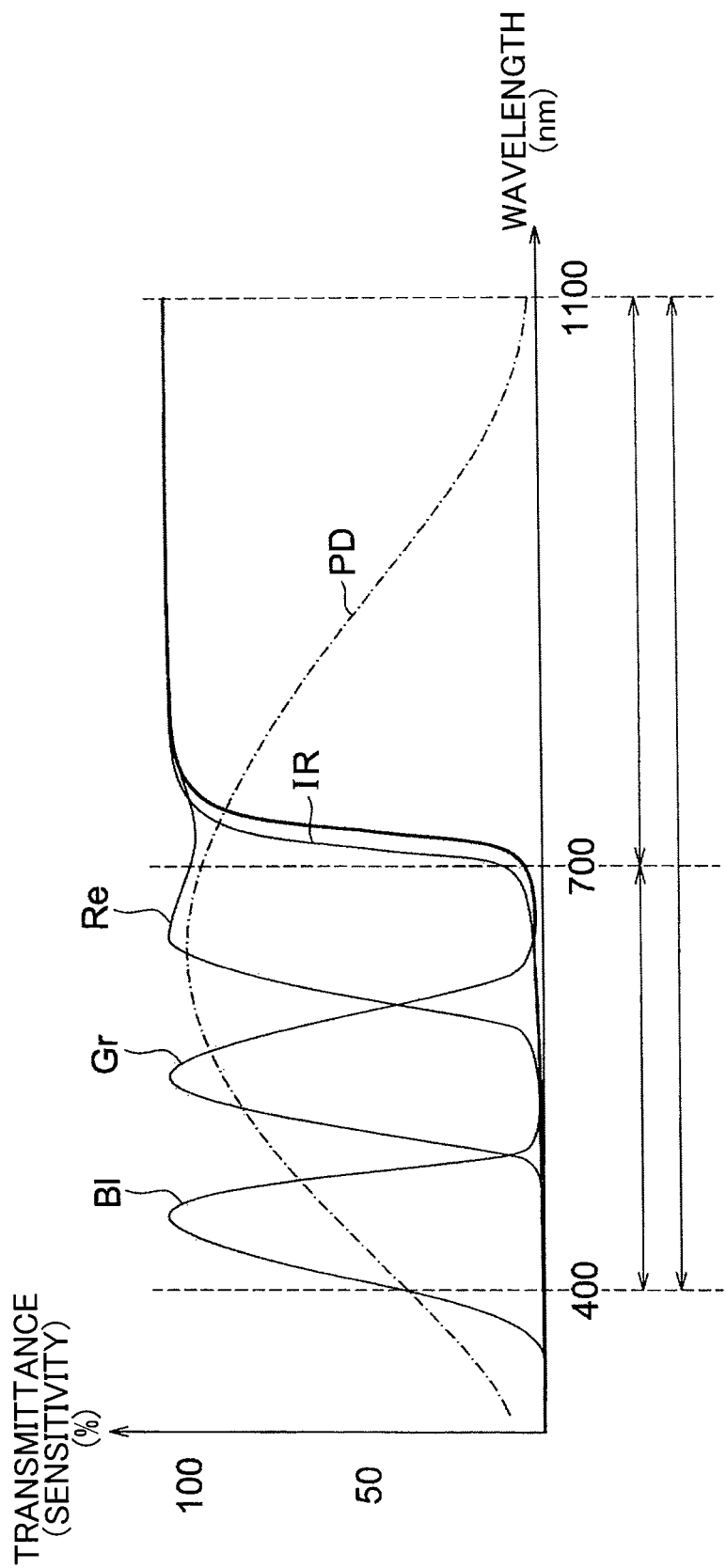
FIG. 13 is a schematic diagram showing a spectral characteristic of each filter, and a spectral sensitivity characteristic of a photodiode in the third example of the configuration of the imaging element.

FIG. 13 shows an example of the spectral characteristic of the imaging element 3. FIG. 13 is a schematic diagram showing the spectral characteristic of each filter, and the spectral sensitivity characteristic of a photodiode PD in the third example of the configuration of the imaging element.

Referring to FIG. 13, the Bl filters transmit light in the blue wavelength region in the visible wavelength region, and transmit light in the infrared wavelength region; the Gr filters transmit light in the green wavelength region in the visible wavelength region, and light in the infrared wavelength region; the Re filters transmit light in the red wavelength region in the visible wavelength region, and light in the infrared wavelength region; and the IR filters transmit light in the infrared wavelength region. To simplify the description, IR is also called as a color.

On the other hand, the photodiode PD in the imaging element 3 has a sensitivity in the range from about 300 nm to 1,100 nm, and has a sensitivity peak from about 650 nm to 700 nm. The sensitivity range and the sensitivity peak vary depending on the structures of photodiodes PD, impurity concentrations, and the like.

In view of the above, the Bl pixels 31 in the imaging element 3 have a sensitive wavelength region in the blue wavelength region in the visible wavelength region, and in the range from 700 nm to 1,100 nm in the infrared wavelength region; the Gr pixels have a sensitive wavelength region in the green wavelength region in the visible wavelength region, and in the range from 700 nm to 1,100 nm in the infrared wavelength region; the Re pixels have a sensitive wavelength region from the red wavelength region in the visible wavelength region to 1,100 nm in the infrared wavelength region, and the IR pixels have a sensitive wavelength region in the range from 700 nm to 1,100 nm in the infrared wavelength region.

In the case where the third example of the configuration of the imaging element 3 is used, it is necessary to modify the equation (2) and the equation (2') in Step S439, and modify the equation (3-1), the equation (3-2), and the equation (3-3) in Step S453 regarding color processing as follows, because the configuration of color filters is different from the example shown in FIG. 2 and from the example shown in FIG. 10. Here, these equations are modified as follows.

$$Yadd=(B17+Gr7+Re7+IR7)/4 \quad (2)$$

$$Yadd=(a1 \times B17+a2 \times Gr7+a3 \times Re7+a4 \times IR7)/4 \quad (2')$$

$$R=Re9-IR9 \quad (3\text{-}1)$$

$$G=Gr9-IR9 \quad (3\text{-}2)$$

$$B=B19-IR9 \quad (3\text{-}3)$$

As described above, in the imaging device of the first embodiment provided with an imaging optical system, an imaging element having a linear-log characteristic, and an image processing section, original image data is obtained by using the imaging element which has a sensitive wavelength region including an infrared wavelength region, and selectively including a visible wavelength region, and which is composed of four types of pixels having spectral sensitivities different from each other. The imaging device is configured to extract a luminance signal including an infrared wavelength component, and a color-difference signal from the original image data; and to modulate the color-difference signal based on a high frequency component in the luminance signal including the infrared wavelength component. With this configuration, it is possible to provide the imaging device that enables to prevent fake color generation in an edge portion, resulting from the color filter arrangement of the imaging element, and to obtain a clear color image having an enhanced S/N ratio at nighttime and having a wide D-range.

Figure 14A:
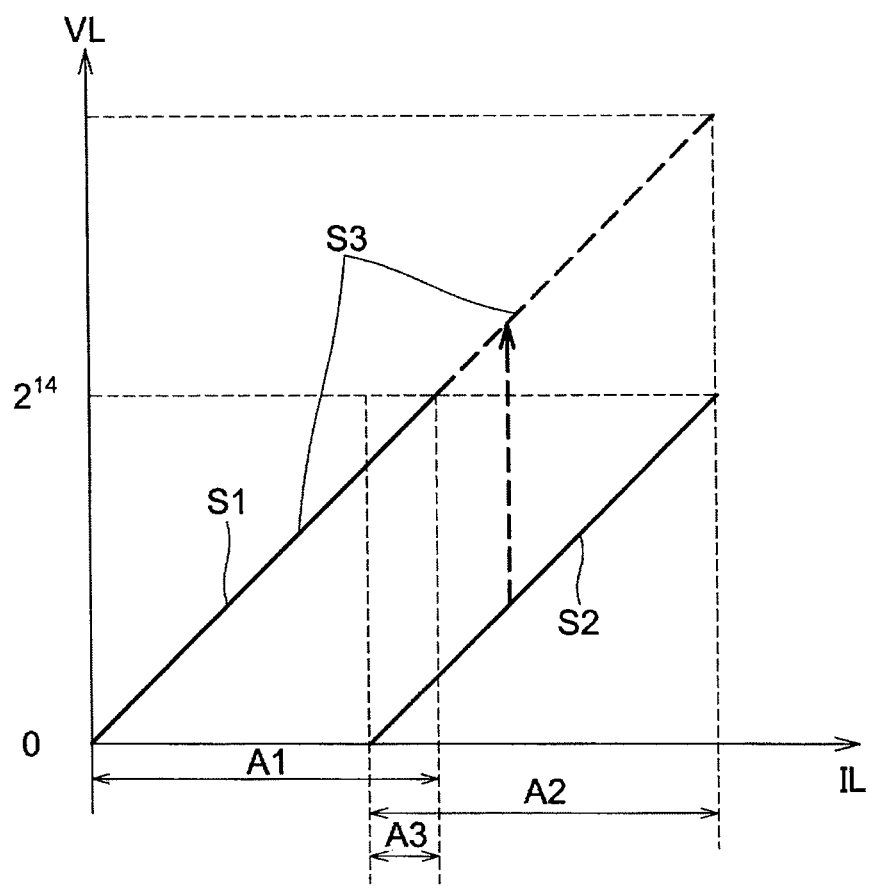
FIGS. 14A and 14B are schematic diagrams showing a characteristic and a configuration of an imaging element to be used in a second embodiment of the imaging device.
Figure 14B:
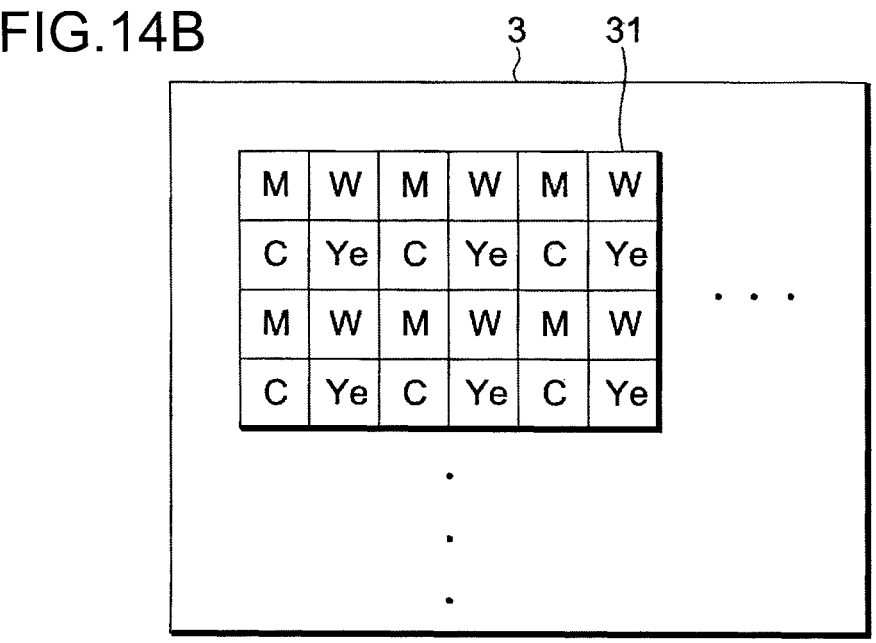

In the following, a second embodiment of the imaging device of the invention is described referring to FIG. 14A through FIG. 16. Since the configuration of the second embodiment of the imaging device is substantially the same as the one shown in FIG. 1, description thereof is omitted herein. FIGS. 14A and 14B are schematic diagrams showing a characteristic and a configuration of an imaging element to be used in the second embodiment of the imaging device. FIG. 14A is a schematic diagram showing a photoelectric conversion characteristic of the imaging element, and FIG. 14B is a schematic diagram showing a filter arrangement of the imaging element.

Referring to FIG. 14A, the imaging element 3 has an ordinary linear photoelectric conversion characteristic. A first photoelectric conversion characteristic S1 is obtained by performing an imaging operation with respect to a low luminance region A1 for a first exposure time T1, with use of the imaging element 3 having an ordinary linear photoelectric conversion characteristic. Likewise, a second photoelectric conversion characteristic S2 is obtained by performing an imaging operation with respect to a high luminance region A2, which is brighter than the low luminance region A1 and which includes a luminance region A3 overlapping with the low luminance region A1, for a second exposure time T2 shorter than the first exposure time T1.

It is possible to obtain a photoelectric conversion characteristic S3 having such a wide D-range as to cover the low luminance region A1 and the high luminance region A2 by interconnecting the first photoelectric conversion characteristic S1 and the second photoelectric conversion characteristic S2 at a position corresponding to the luminance region A3 where the first photoelectric conversion characteristic S1 and the second photoelectric conversion characteristic S2 overlap each other. Theoretically, the luminance region A3 where the first photoelectric conversion characteristic S1 and the second photoelectric conversion characteristic S2 overlap each other is not necessary. Therefore, it is possible to maximally obtain a D-range two times as wide as the D-range of an ordinary linear photoelectric conversion characteristic by the aforementioned method.

Thus, in the case where the first photoelectric conversion characteristic S1 and the second photoelectric conversion characteristic S2 each is composed of data of e.g. 14 bits, the resultant photoelectric conversion characteristic S3 is composed of data of 28 bits. It is also possible to interconnect three or more luminance regions in the same manner as described above.

Referring to FIG. 14B, the imaging element 3 has a number of pixels 31 arranged in a two-dimensional matrix. The imaging element 3 is configured in such a manner that pixels 31, in each of which one of three types of complementary color filters i.e. a yellow (Ye) filter, a magenta (M) filter, and a cyan (C) filter is provided, and pixels 31, in which no filter (to simplify the description, called as a W filter) is provided, are regularly arranged.

In the example shown in FIG. 14B, pixels 31 provided with M filters, and pixels 31 provided with W filters are alternately arranged in a certain row, and pixels 31 provided with C filters and pixels 31 provided with Ye filters are alternately arranged in a row succeeding the certain row. The above pattern is alternately repeated with respect to each row. The filter arrangement, however, is not limited to the above.

Figure 15:
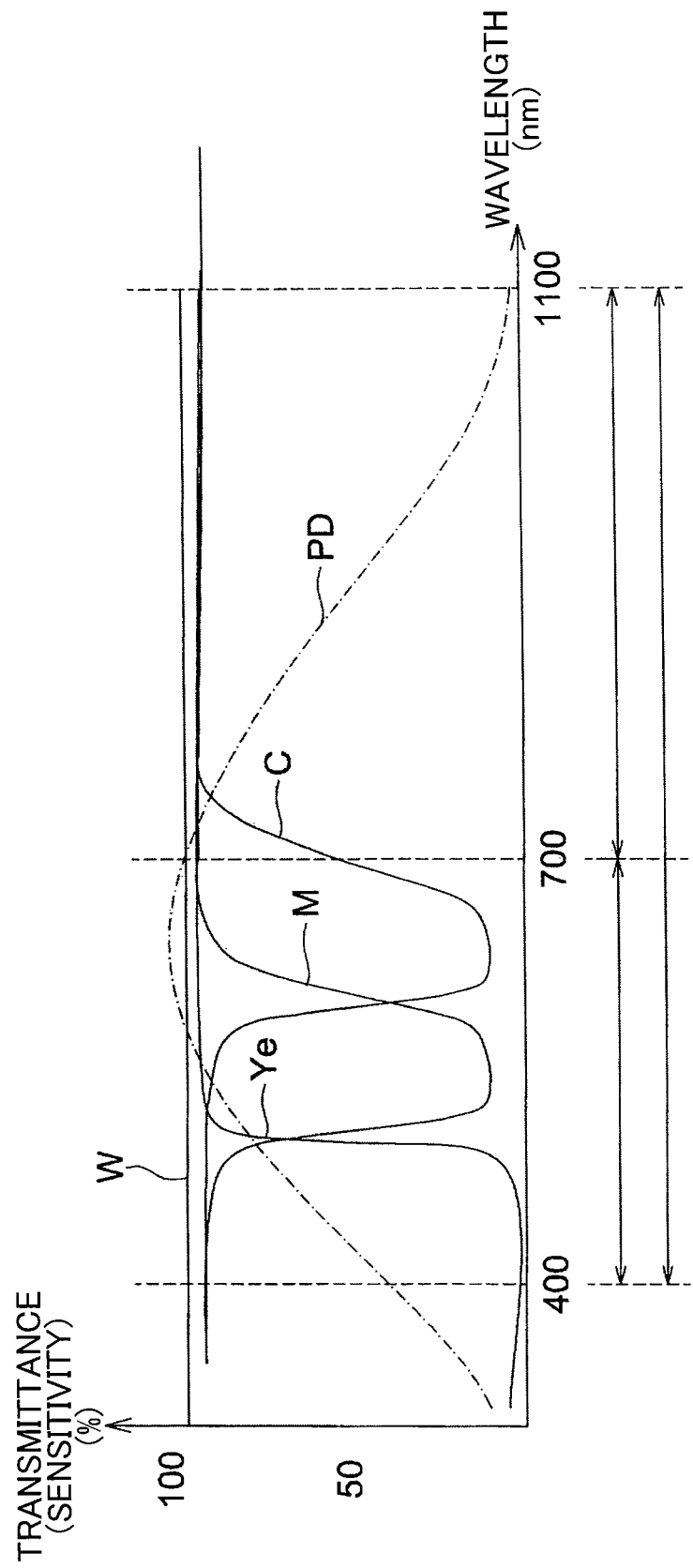
FIG. 15 is a schematic diagram showing an example of the spectral characteristic of each filter, and an example of the spectral sensitivity characteristic of a photodiode in the imaging element.

FIG. 15 shows an example of the spectral characteristic of the imaging element 3. FIG. 15 is a schematic diagram showing an example of the spectral characteristic of each filter, and an example of the spectral sensitivity characteristic of a photodiode PD in the imaging element 3.

Referring to FIG. 15, the Ye filters transmit light in a wavelength region other than the blue wavelength region in the visible wavelength region, and transmit light in the infrared wavelength region; the M filters transmit light in a wavelength region other than the green wavelength region in the visible wavelength region, and transmit light the infrared wavelength region, the C filters transmit light in a wavelength region other than the red wavelength region in the visible wavelength region, and transmit light in the infrared wavelength region; and the W filters transmit light in the visible wavelength region, and transmit light in the infrared wavelength region. To simplify the description, W is also called as a color.

On the other hand, the photodiode PD in the imaging element 3 has a sensitivity in the range from about 300 nm to 1,100 nm, and has a sensitivity peak from about 650 nm to 700 nm. The sensitivity range and the sensitivity peak vary depending on the structures of photodiodes PD, impurity concentrations, and the like.

In view of the above, pixels 31 (hereinafter, called as Ye pixels. The same definition is also applied to the respective color pixels) provided with Ye filters in the imaging element 3 have a sensitive wavelength region in the range from the green wavelength region in the visible wavelength region to 1,100 nm in the infrared wavelength region. The M pixels have a sensitive wavelength region in the range from the blue wavelength region and the red wavelength region in the visible wavelength region to 1,100 nm in the infrared wavelength region. The C pixels have a sensitive wavelength region in the range from the blue wavelength region and the green wavelength region in the visible wavelength region, and in the range from 700 nm to 1,100 nm in the infrared wavelength region. The W pixels have a sensitive wavelength region in the range from 300 nm to 1,100 nm.

Figure 16:
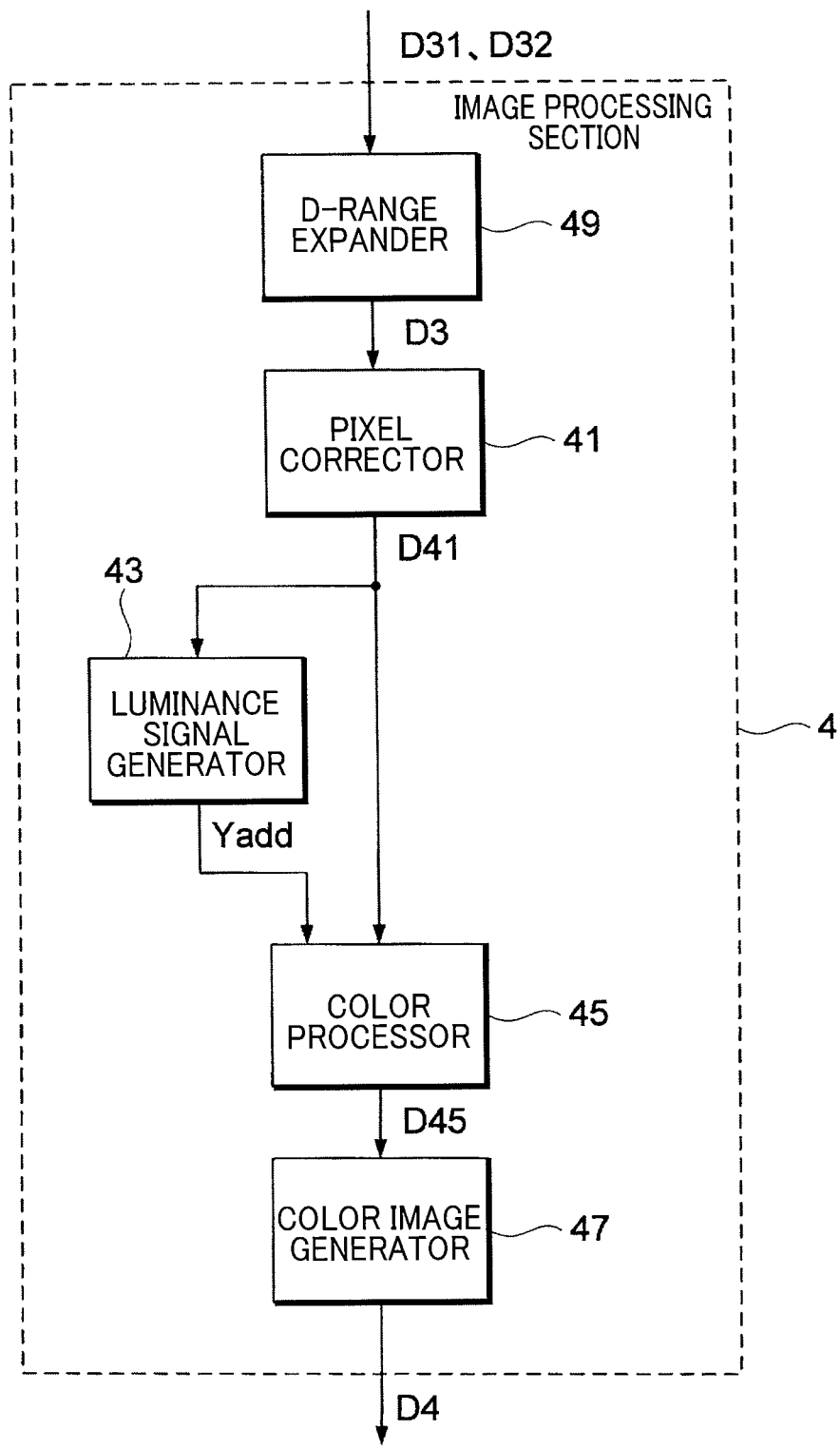
FIG. 16 is a block diagram showing a configuration of an image processing section in the second embodiment.

FIG. 16 is a block diagram showing a configuration of an image processing section 4 in the second embodiment.

Referring to FIG. 16, the image processing section 4 has a D-range expander 49 at a position anterior to a pixel corrector 41 corresponding to the pixel corrector 41 in the first embodiment shown in FIG. 4.

The D-range expander 49 combines and generates D-range expanded original image data D3 (Ye, M, C, W) by the method described referring to FIG. 14A, based on image data D31 (Ye, M, C, W) which is obtained by an imaging operation of the imaging element 3 for the first exposure time T1, and based on image data D32 (Ye, M, C, W) which is obtained by an imaging operation of the imaging element 3 for the second exposure time T2 different from the first exposure time T1, succeeding the image data D31. Thereafter, image processing is performed with use of original image data D3. Since the configuration of the pixel corrector 41 thereafter is substantially the same as the configuration shown in FIG. 4, description thereof is omitted herein. The image data D31 and the image data D32 are not limited to the ones obtained by sequential imaging operations. Further alternatively, original image data may be generated by combination with use of three or more frames of image data obtained by imaging operations for exposure times different from each other.

The original image data D3 is data having a linear characteristic. Therefore, Step S413 (linear-log conversion), Step S435 (log-linear conversion), and Step S451 (log-linear conversion) among the operations to be performed by the respective parts in the image processing section 4 shown in FIG. 5 through FIG. 9 are not necessary. Thus, it is possible to handle all the operations to be performed by the respective parts in the image processing section 4, with use of data each having a linear characteristic.

However, as described above, the original image data D3 is data having a large bit number. Accordingly, the computations thereafter may be performed by converting the original image data D3 into data having a small bit number by logarithmically compressing the original image data D3 in Step S413 (linear-log conversion). In such a case, linear expansion in Step S435 (log-linear conversion) and Step S451 (log-linear conversion) is necessary.

Further, the color filter arrangement of the imaging element 3 in the second embodiment is different from the one in the first embodiment. Accordingly, it is necessary to modify the equation (2) and the equation (2') in Step S439, and modify the equation (3-1), the equation (3-2), and the equation (3-3) in Step S453 regarding color processing as follows. Here, these equations are modified as follows.

$$Yadd = (Ye7 + M7 + C7 + W7)/4 \quad (2)$$

$$Yadd = (a1 \times Ye7 + a2 \times M7 + a3 \times C7 + a4 \times W7)/4 \quad (2')$$

$$R = W9 - C9 \quad (3\text{-}1)$$

$$G = W9 - M9 \quad (3\text{-}2)$$

$$B = W9 - Ye9 \quad (3\text{-}3)$$

Since the other operations of the respective parts in the image processing section 4 in the second embodiment are substantially the same as those shown in FIG. 5 through FIG. 9, description thereof is omitted herein.

As described above, in the imaging device of the second embodiment provided with an imaging optical system, an imaging element having a linear characteristic, and an image processing section, at least two frames of image data are obtained with use of the imaging element which has a sensitive wavelength region including an infrared wavelength region, and selectively including a visible wavelength region, and which is composed of four types of pixels having spectral sensitivities different from each other for exposure times different from each other. The imaging device is configured to extract a luminance signal including an infrared wavelength component, and a color-difference signal, from the original image data obtained by combining at least two frames of images; and to modulate the color-difference signal based on a high frequency component in the luminance signal including the infrared wavelength component. With this configuration, it is possible to provide the imaging device that enables to prevent fake color generation in an edge portion, resulting from the color filter arrangement of the imaging element, and to obtain a clear color image having an enhanced S/N ratio at nighttime and having a wide D-range.

Figure 17:
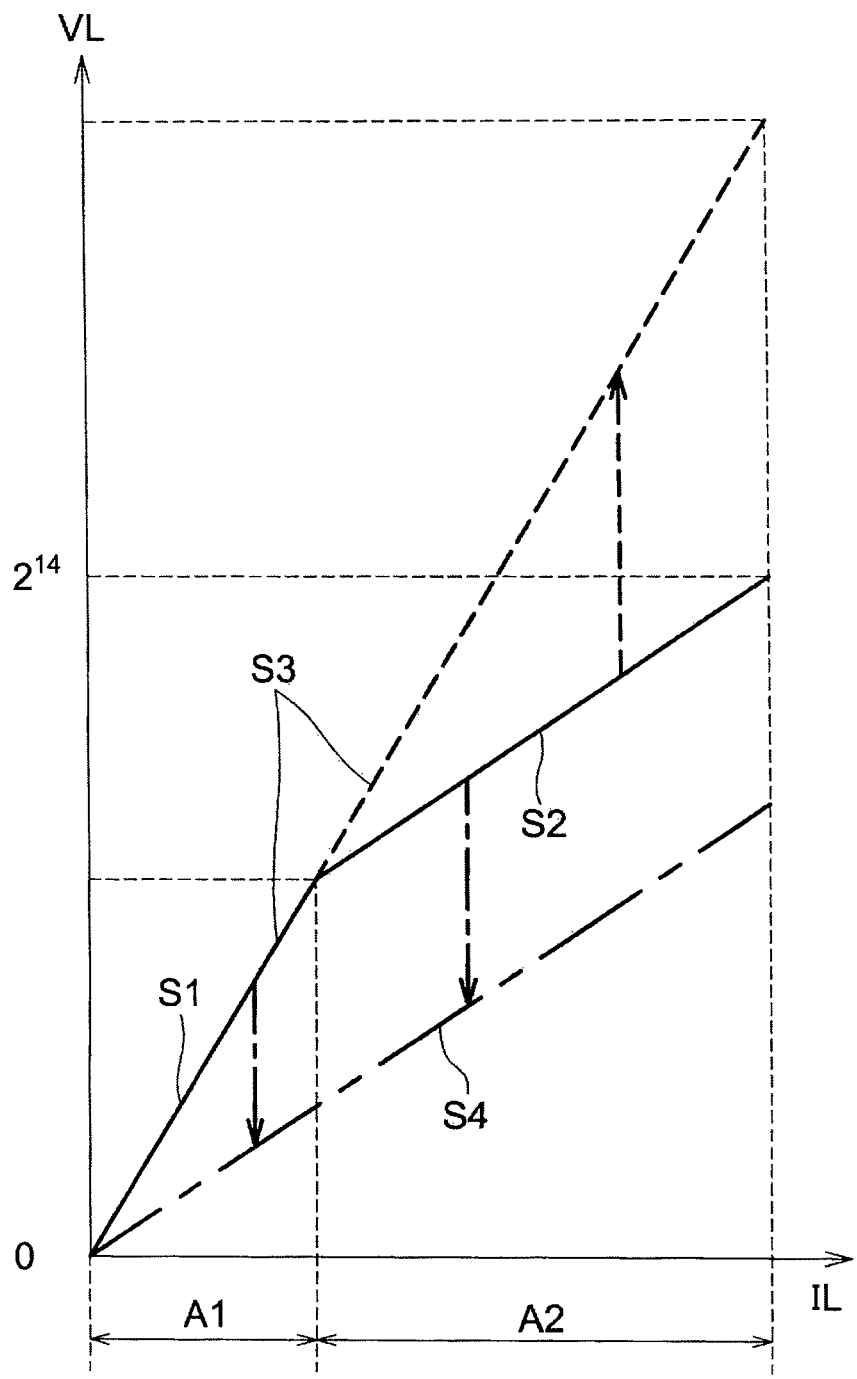
FIG. 17 is a schematic diagram showing a photoelectric conversion characteristic of an imaging element to be used in a third embodiment of the imaging device.

In the following, a third embodiment of the imaging device of the invention is described referring to FIG. 17. Since the configuration of the third embodiment of the imaging device is substantially the same as shown in FIG. 1, description thereof is omitted herein. FIG. 17 is a schematic diagram showing a photoelectric conversion characteristic of an imaging element to be used in the third embodiment of the imaging device.

Referring to FIG. 17, the imaging element 3 has a linear photoelectric conversion characteristic called a knee characteristic having gradients different from each other. The knee characteristic has a first linear photoelectric conversion characteristic S1 whose gradient is large in a low luminance region A1 where the incident light amount IL is small, and a second linear photoelectric conversion characteristic S2 whose gradient is small in a high luminance region A2 where the incident light amount IL is large.

Similarly to the second embodiment, it is possible to obtain a linear photoelectric conversion characteristic S3 having such a wide D-range as to cover the low luminance region A1 and the high luminance region A2 by extending the second photoelectric conversion characteristic S2 along an extended line of the first photoelectric conversion characteristic S1 by a D-range expander 49 corresponding to the D-range expander 49 in the image processing section 4 shown in FIG. 16. Alternatively, it is possible to obtain a linear photoelectric conversion characteristic S4 having a small bit number but sufficient to cover the low luminance region A1 and the high luminance region A2 by setting the gradient of the first photoelectric conversion characteristic S1 to coincide with the gradient of the second photoelectric conversion characteristic S2, and by interconnecting the first photoelectric conversion characteristic S1 and the second photoelectric conversion characteristic S2.

Since the configuration after the pixel corrector 41 is substantially the same as the configuration shown in FIG. 4, description thereof is omitted herein. Further, since the original image data obtained by the aforementioned processing is data having a linear characteristic, Step S413 (linear-log conversion), Step S435 (log-linear conversion), and Step S451 (log-linear conversion) are not necessary as well as in the second embodiment. Further, the color processing may be performed by the equations described in the first embodiment or the equations described in the second embodiment, depending on the filters to be used.

As described above, in the imaging device of the third embodiment provided with an imaging optical system, an imaging element having a knee characteristic, and an image processing section, original image data is obtained by using the imaging element which has a sensitive wavelength region including an infrared wavelength region, and selectively including a visible wavelength region, and which is composed of four types of pixels having spectral sensitivities different from each other. The imaging device is configured to extract a luminance signal including an infrared wavelength component, and a color-difference signal from the original image data; and to modulate the color-difference signal based on a high frequency component in the luminance signal including the infrared wavelength component. With this configuration, it is possible to provide the imaging device that enables to prevent fake color generation in an edge portion, resulting from the color filter arrangement of the imaging element, and to obtain a clear color image having an enhanced S/N ratio at nighttime and having a wide D-range.

In the first through third embodiments, the imaging element 3 is provided with four different types of filters. Alternatively, the imaging element may be provided with at least three types of filters. In the modification, it is possible to use filters of such types that enable to generate color signals of red (R), green (G), and blue (B), utilizing the spectral transmission characteristics of the respective filters.

As described above, according to an aspect of the invention, in an imaging device provided with an imaging optical system, an imaging element, and an image processing section, original image data including at least three types of original image components is obtained by using the imaging element which has a sensitive wavelength region including an infrared wavelength region, and selectively including a visible wavelength region, and which is composed of at least three types of pixels having spectral sensitivities different from each other. The imaging device is configured to generate a color signal, based on a luminance signal including an infrared wavelength component that has been generated based on a signal obtained by compressing the dynamic range of the original image data including at least the three types of original image components, and based on a color-difference signal that has been generated based on the visible wavelength component in the original image data. With this configuration, it is possible to provide an imaging device that enables to prevent lowering of saturation of a color signal resulting from compression of the dynamic range including an infrared wavelength component, and to obtain a clear color image having an enhanced S/N ratio at nighttime, and having a wide dynamic range.

The detailed configuration and the detailed operation of each of the elements constituting the inventive imaging device may be modified as necessary, as far as such modification does not depart from the gist of the invention.

REFERENCE SIGNS LIST

1: imaging device
2: imaging optical system
21: optical axis
3: imaging element
31: pixel
4: image processing section
41: pixel corrector
43: luminance signal generator
431: illumination component extractor
433: illumination component compressor
45: color processor
456: fake color suppressor
456a: luminance high-frequency detector
456b: color-difference signal modulator
47: color image generator
49: D-range expander
5: control section
6: storage section
7: display section
8: interface (I/F) section
L: illumination component
L': compressed illumination component
IL: incident light amount
VL: output
Pt: inflection point
Yadd: luminance signal
Y: visible luminance signal
Cb, Cr: color-difference signal
D4: color image

The invention claimed is:

1. An imaging device, comprising:
an imaging optical system which forms a subject image;
an imaging element which has a sensitive wavelength region including an infrared wavelength region, and selectively including a visible wavelength region, the imaging element being composed of at least three types of pixels having spectral sensitivities different from each other, and configured to generate original image data including at least three types of original image components to be outputted from each of the pixels by imaging the subject image; and
an image processing section comprising a processor, the image processing section including:
 a dynamic range compressor which compresses a dynamic range of the original image data for generating dynamic range compressed image data by extracting an illumination component of the original image data by using a low-pass filter, and compressing the extracted illumination component;
 a luminance signal generator which generates a luminance signal including an infrared wavelength component by summing up and averaging the original image components at each pixel in the dynamic range compressed image data, or applying a weight to each of the original image components at each pixel in the dynamic range compressed image data;
 a color signal data generator which generates color signal data by performing subtraction between the original image components, and extracting a visible wavelength component from the original image data;
 a color-difference signal generator which generates a color-difference signal by performing color space conversion to the color signal data; and
 a color image generator which generates a color image by: calculating an edge amount of the original image data by applying an edging detection filter to the luminance signal; specifying a fake color suppressing coefficient such that the color suppressing coefficient decreases as the edge amount increases; multiplying the specified fake color suppressing coefficient by the color difference signal; and performing color space conversion to the multiplied color-difference signal.

2. The imaging device according to claim 1,
wherein the image processing section includes a dynamic range compressed color signal generator which generates a dynamic range compressed color signal by extracting an illumination component of the color signal data by using the low-pass filter, and compressing the extracted illumination component to thereby compress a dynamic range of the color signal data, and
wherein the color-difference signal generator generates the color-difference signal by performing the color space conversion to the dynamic range compressed color signal.

3. The imaging device according to claim 1,
wherein the image processing section includes a dynamic range compressed color-difference signal generator which generates a dynamic range compressed color-difference signal by extracting an illumination component of the color-difference signal by using the low-pass filter, and compressing the extracted illumination component to thereby compress a dynamic range of the color-difference signal, and
wherein the color image generator generates the color image by: calculating an edge amount of the original image data by applying the edging detection filter to the luminance signal; specifying a fake color suppressing coefficient such that the color suppressing coefficient decreases as the edge amount increases; multiplying the specified fake color suppressing coefficient by the dynamic range of the color-difference signal; and performing the color space conversion to the multiplied dynamic range compressed color-difference signal.

4. The imaging device according to claim 1,
wherein the imaging element is configured in such a manner that first pixels, second pixels, third pixels, and fourth pixels are regularly arranged in a two-dimensional matrix,
wherein the first pixels have a sensitive wavelength region including a green wavelength region and a red wavelength region in the visible wavelength region, and the infrared wavelength region,
wherein the second pixels have a sensitive wavelength region including a red wavelength region in the visible wavelength region, and the infrared wavelength region,
wherein the third pixels have a sensitive wavelength region including an entirety of the visible wavelength region, and the infrared wavelength region, and
wherein the fourth pixels have a sensitive wavelength region including the infrared wavelength region.

5. The imaging device according to claim 1,
wherein the imaging element is configured in such a manner that first pixels, second pixels, third pixels, and fourth pixels are regularly arranged in a two-dimensional matrix,
wherein the first pixels have a sensitive wavelength region including a green wavelength region and a red wavelength region in the visible wavelength region, and the infrared wavelength region,
wherein the second pixels have a sensitive wavelength region including a blue wavelength region and a red wavelength region in the visible wavelength region, and the infrared wavelength region,
wherein the third pixels have a sensitive wavelength region including a blue wavelength region and a green wavelength region in the visible wavelength region, and the infrared wavelength region, and
wherein the fourth pixels have a sensitive wavelength region including the visible wavelength region and the infrared wavelength region.

6. The imaging device according to claim 1,
wherein the imaging element is configured in such a manner that first pixels, second pixels, third pixels, and fourth pixels are regularly arranged in a two-dimensional matrix,
wherein the first pixels have a sensitive wavelength region including a red wavelength region in the visible wavelength region, and the infrared wavelength region,
wherein the second pixels have a sensitive wavelength region including a green wavelength region in the visible wavelength region, and the infrared wavelength region,
wherein the third pixels have a sensitive wavelength region including a blue wavelength region in the visible wavelength region, and the infrared wavelength region, and
wherein the fourth pixels have a sensitive wavelength region including the infrared wavelength region.

7. The imaging device according to claim 1, wherein the imaging element has at least two photoelectric conversion characteristics in accordance with an incident light amount, the two photoelectric conversion characteristics being a linear characteristic and a logarithmic characteristic.

8. The imaging device according to claim 1,
wherein the imaging element has a linear photoelectric conversion characteristic, and
wherein the image processing section generates a color image by generating one frame of image data, based on at least two consecutive frames of original image data obtained by imaging operations for exposure times different from each other, and by regarding the one frame of image data as original image data.

9. The imaging device according to claim 1, wherein the imaging element has a first linear photoelectric conversion characteristic having a first gradient in a first luminance region, and a second linear photoelectric conversion characteristic having a second gradient which is smaller than the first gradient in a second luminance region containing a larger incident light amount than the first luminance region.

* * * * *